(12) United States Patent
Maeda et al.

(10) Patent No.: US 7,984,231 B2
(45) Date of Patent: Jul. 19, 2011

(54) INFORMATION RECORDING MEDIUM ACCESS DEVICE, AND DATA RECORDING METHOD

(75) Inventors: Takuji Maeda, Osaka (JP); Shinji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 543 days.

(21) Appl. No.: 12/067,671

(22) PCT Filed: Sep. 12, 2006

(86) PCT No.: PCT/JP2006/318023
§ 371 (c)(1),
(2), (4) Date: Jun. 18, 2008

(87) PCT Pub. No.: WO2007/034706
PCT Pub. Date: Mar. 29, 2007

(65) Prior Publication Data
US 2009/0180209 A1    Jul. 16, 2009

(30) Foreign Application Priority Data
Sep. 22, 2005   (JP) ................................. 2005-276078

(51) Int. Cl.
*G06F 12/00*   (2006.01)
(52) U.S. Cl. ...................................................... 711/103
(58) Field of Classification Search ........................ None
See application file for complete search history.

(56) References Cited

U.S. PATENT DOCUMENTS

| | | |
|---|---|---|
| 6,385,690 B1 | 5/2002 | Iida et al. |
| 2003/0154206 A1 | 8/2003 | Kanai |
| 2005/0069292 A1* | 3/2005 | Yokota et al. ................... 386/95 |
| 2005/0182892 A1* | 8/2005 | Nakanishi et al. ............ 711/103 |
| 2005/0216684 A1 | 9/2005 | So et al. |
| 2005/0231765 A1 | 10/2005 | So et al. |

(Continued)

FOREIGN PATENT DOCUMENTS

EP    1031980    8/2000

(Continued)

OTHER PUBLICATIONS

English language Abstract of JP 56-137442.

(Continued)

*Primary Examiner* — Kaushikkumar Patel
(74) *Attorney, Agent, or Firm* — Greenblum & Bernstein, P.L.C.

(57) ABSTRACT

When moving image data or the like is recorded into an information recording medium, such as a flash memory, in real time, an influence of locations of free recording areas upon the recording speed is suppressed to ensure the real time performance of the data recording. In an access apparatus, there is provided an area management block control part that manages FAT1 and FAT2, which are area management information of a nonvolatile memory, on a FAT block-by-FAT block basis, and the length of the free recording area in each FAT block is calculated. Then, area management block information, in which the free recording area length in each FAT block is recorded, is generated on a RAM. A FAT block in which the free recording area length exceeds a threshold value is assigned to the data recording, thereby suppressing the number of updates of the area management information regardless of the location of the free areas. In this way, the buffer overflow can be prevented from occurring due to a high frequency of the updating of the area management information, thereby ensuring the real time performance during the data recording.

8 Claims, 26 Drawing Sheets

U.S. PATENT DOCUMENTS

| | | |
|---|---|---|
| 2006/0126469 A1* | 6/2006 | Urushibara et al. ......... 369/53.2 |
| 2006/0195672 A1 | 8/2006 | Inoue et al. |
| 2006/0224819 A1* | 10/2006 | Ito ................................ 711/103 |
| 2007/0036524 A1* | 2/2007 | Kawachi ...................... 386/124 |
| 2007/0162707 A1 | 7/2007 | So et al. |
| 2007/0300078 A1 | 12/2007 | Ochi et al. |

FOREIGN PATENT DOCUMENTS

| | | |
|---|---|---|
| JP | 56-137442 | 10/1981 |
| JP | 7-325669 | 12/1995 |
| JP | 9-251407 | 9/1997 |
| JP | 2005-50383 | 2/2005 |

OTHER PUBLICATIONS

English language Abstract of JP 7-325669.
English language Abstract of JP 2005-50383.
English language Abstract of JP 9-251407.

* cited by examiner

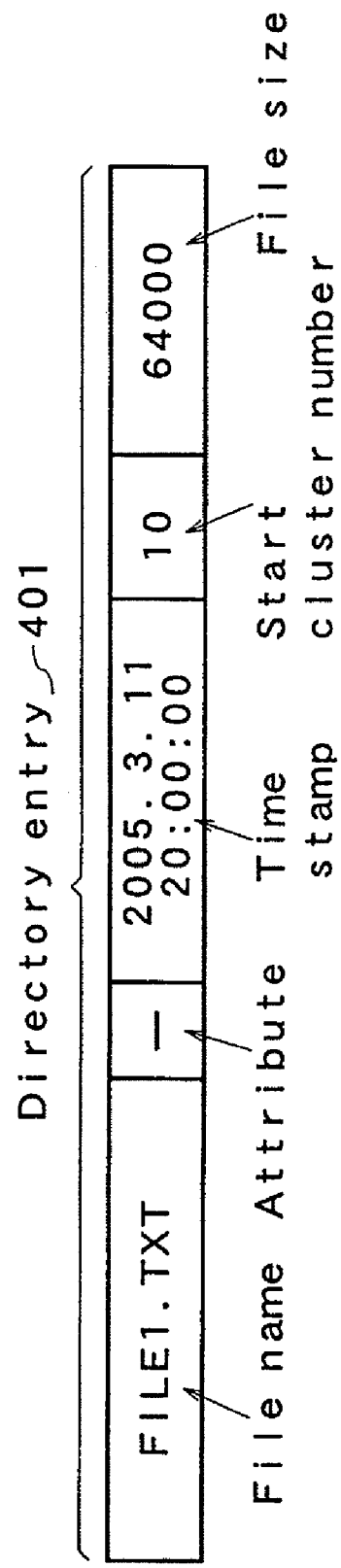

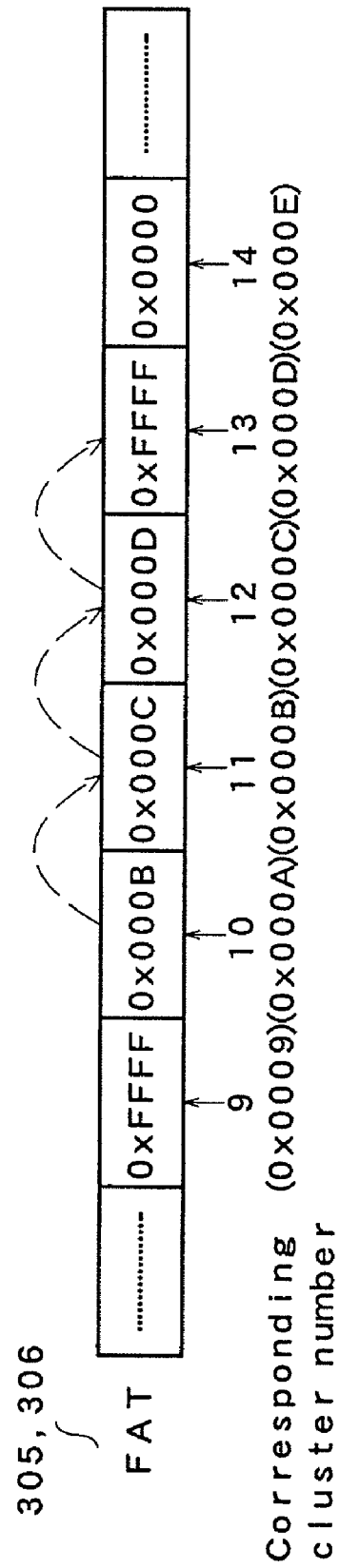

| FAT block number | Empty cluster number | Valid flag |
|---|---|---|
| 1 | 154 | VALID |
| 2 | 234 | VALID |
| 3 | 23 | INVALID |
| 4 | 56 | INVALID |
| 5 | 178 | VALID |
| ⋮ | ⋮ | ⋮ |
| N-1 | 256 | VALID |
| N | 110 | VALID |

F I G. 1 9 A
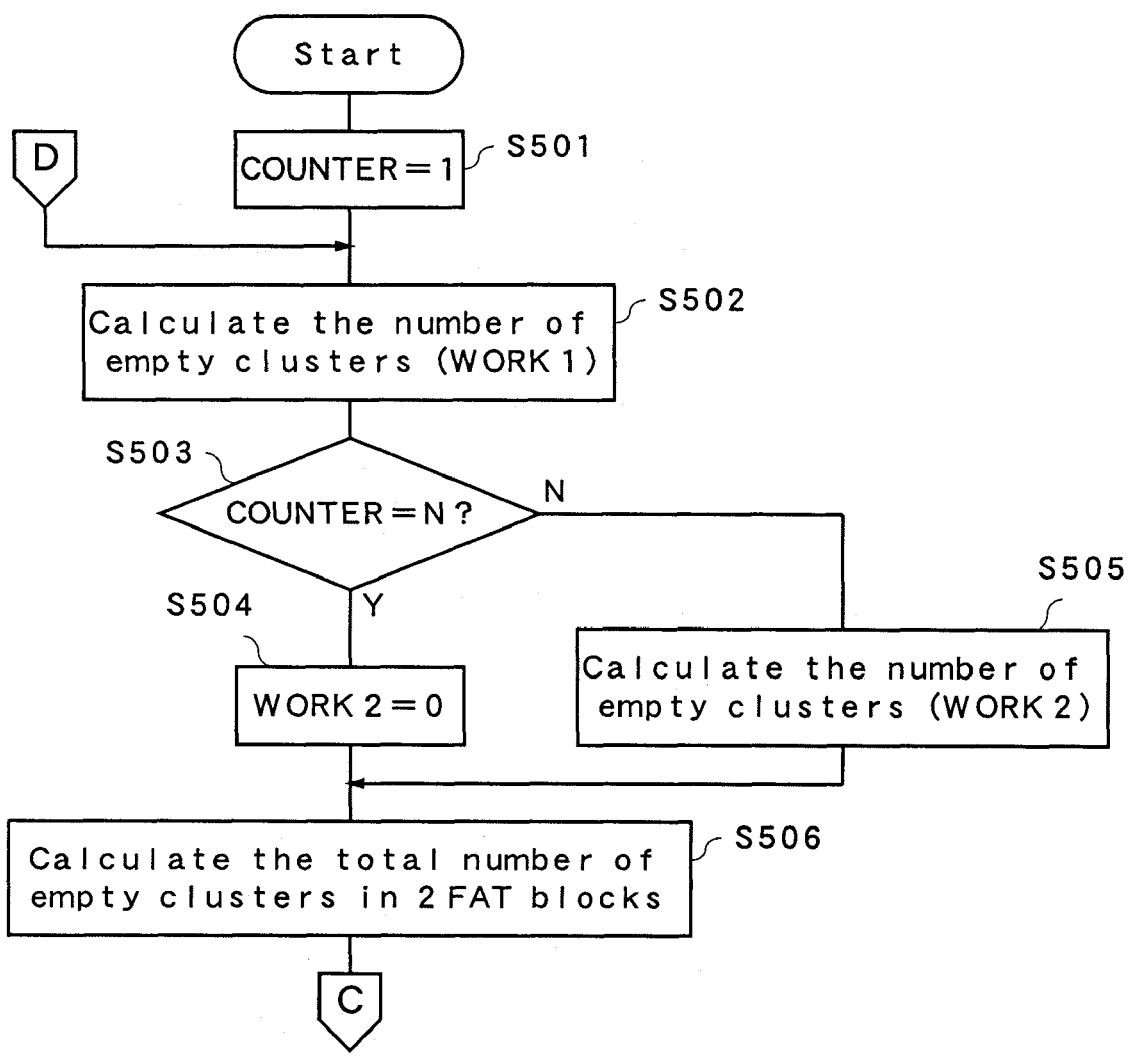

FIG. 21

| COUNTER | WORK 1 | WORK 2 | EMPTY_CLU_NUM |
|---|---|---|---|
| 1 | 154 | 234 | 388 |
| 2 | 234 | 23 | 257 |
| 3 | 23 | 56 | 79 |
| 4 | 56 | 178 | 234 |
| ⋮ | | | |
| N−1 | | | |
| N | | | |

FIG. 22A

|   |   |   |   |   |   |   |   |
|---|---|---|---|---|---|---|---|
| × | × | × | ○ | ○ | ○ | ○ | ○ |
| ○ | ○ | × | ○ | × | ○ | ○ | ○ |
| × | × | ○ | × | × | × | ○ | × |
| ○ | × | × | × | × | ○ | ○ | ○ |

FIG. 22B

| | | | | | | | | |
|---|---|---|---|---|---|---|---|---|
| (1) | × | × | × | ○ | ○ | ○ | ○ | ○ |
| (2) | ○ | ○ | × | ○ | × | ○ | ○ | ○ |
| (3) | × | × | ○ | × | × | × | ○ | × |
| (4) | ○ | × | × | × | × | ○ | ○ | ○ |

INFORMATION RECORDING MEDIUM ACCESS DEVICE, AND DATA RECORDING METHOD

TECHNICAL FIELD

The present invention relates to an information recording medium access device for accessing an information recording medium managing stored data by a file system, and to a data recording method for the information recording medium.

BACKGROUND ART

Information recording media that record digital data such as music contents and video contents include various types: a hard disk, an optical disk, etc. Memory cards as one type of these information recording media are small in size and light in weight, and thus are used mainly in small-sized mobile devices such as digital still cameras, mobile phone terminals, etc. and have become increasingly and rapidly widespread.

Predominant semiconductor memories currently used as recording devices of a memory card are flash memories such as an EEPROM and flash ROM. In particular, an NAND type flash memory used in many information recording media is characterized in that for the purpose of data writing, it needs to be put into an unrecorded state by erasing data recorded in a write destination before the data writing. Here, a unit in which data is erased is referred to as an erase block and managed as a block composed by a collection of a plurality of sectors each serving as a minimum unit for access.

FIG. 1 is a diagram showing one example of relationship between erase blocks and sectors in a flash memory. In the example of FIG. 1, one erase block is composed of 32 sectors. Access can be achieved in units of sectors, for example, 512 bytes (B), but data erase processing required prior to writing is performed in units of erase blocks, for example, 16 kB. For a capacity of a recording area, 64000 consecutive 16 kB-erase blocks are shown as an example.

To record data of one erase block (16 kB) into the flash memory, more specifically, record processing is executed in the following procedures:

(1) Interpreting a command inputted from an access device;

(2) Acquiring one erase block where no valid data is stored and then erase data in the erase block (equivalent to one erase block); and (3) Recording inputted data of one erase block from the access device into the erase block from which the data has been erased at (2).

To record data of one sector (512B) into the flash memory, record processing is executed in the following procedures:

(1) Interpreting a command inputted from the access device;

(2) Acquiring one erase block where no valid data is stored and then erase data in the erase block (equivalent to one erase block);

(3) Recording inputted data of one sector from the access device into the erase block from which the data has been erased at (2); and (4) Copying valid data of another erase block into the remaining 31 sectors of the erase block on which one-sector recording has been done.

As described above, the record processing performed on the NAND type flash memory includes three major processing: command interpretation processing, data erase processing, and data record processing.

For example, assume a NAND type flash memory that requires 3 msec. for the command interpretation processing, 200 µsec. for the processing of recording data of one sector, and 2 msec. for the processing of erasing one erase block (16 kB). To record data of one erase block (16 kB) into this NAND type flash memory according to the recording procedures indicated above, it requires 3 msec. for the command interpretation, 2 msec. for the erasing processing, and 32×200 µsec. for the data record processing, thus requiring a total processing time of 11.4 msec. Similarly, to record data of one sector (512B), it requires 3 msec. for the command interpretation, 2 msec for the erasing processing, and 200 µsec.+31× 200 µsec. for the data record processing, thus requiring a total processing time of 11.4 msec.

Therefore, almost the same length of time is required for writing data of 16 kB (one erase block, 32 sectors) and for writing data of 512B (one sector). Comparison after conversion of the processing time into time required for writing per sector shows that shorter time is required for recording data of one erase block. The description of this example refers to a case where an extremely large difference in performance is observed without consideration of data transfer time, etc., but even on an actual NAND type flash memory, the write time is smallest when writing is performed in units of erase blocks.

Here, the characteristics of the NAND type flash memory have been described, and the same applies to a hard disk, an optical disk, and the like. In recording into non-consecutive addresses in small units, seek processing that physically moves a magnetic head or an optical head occurs frequently, which requires much time for processing other than data writing, thereby resulting in a decreased recording speed. Similarly to the NAND type flash memory, they have a characteristic that they can achieve collective recording into consecutive areas at higher speed than recording into non-consecutive positions in small units.

On the other hand, data stored in an information recording medium is managed by a file system, so that the user can handle the stored data as a file with ease. File systems conventionally used include: a FAT file system, a UDF (Universal Disk Format) file system, an NTFS file system (New Technology File system), etc. Memory cards with data managed by these file systems can be shared among devices interpreting the same file system, which permits data supply and reception among the devices.

As one example of the file systems, the FAT file system will be described. FIG. 2 shows a configuration of the FAT file system. The file system is built on a logical address space inside an information recording medium. Found at the top of the logical address space in the FAT file system is a file system management information area 301 storing management information for an entire area managed by the FAT file system. Found following this is a user data area 302 in which data inside the file, etc. is stored. The file system management information area 301 is composed of: a master boot record-partition table (MBR-PT) 303, partition boot sector (PBS) 304, FATs 305 and 306 as area management information, and a root directory entry (RDE) 307.

The MBR-PT 303 is a portion storing information for dividing the entire area on the logical address space managed by the file system into a plurality of areas and managing them individually as partitions. The PBS 304 is a portion in which management information inside one partition is stored. The FATs 305 and 306 are portions indicating physical storage position of data included in a file. Further, the RDE 307 is a portion storing information on a file and directory found immediately below a root directory. Moreover, since the FATs 305 and 306 are important areas indicating the physical storage position of data included in the file, the FAT 305 and FAT 306 which have the same information are usually present in the file system management information area 301, thereby achieving duplication for safety.

The user data area 302 is divided into management units called clusters in all the area thereof for management, each of which stores data included in the file. The typical cluster size is approximately 512B to 32 kB. When a file size is larger than the cluster size, the data included in the file is stored striding over a plurality of clusters, and association between the clusters is managed by link information stored in the FATs 305 and 306.

FIGS. 3A, 3B, and 3C show, each as one example, a directory entry 401, FATs 305 and 306, and a user data area 302, respectively, in the FAT file system. The FAT file system stores the directory entry 401 that stores information such as a file name, file size, file attribute, etc. in the RDE 307 and a part of the user data area 302. The directory entry 401 includes a file name, attribute, time stamp, start cluster number, and file size.

The directory entry shown in an example of FIG. 3A stores information related to a file whose file name is "FILE1.TXT". The head portion of data included in this file is stored in a cluster with cluster number 10, and the file size is 64000B. Moreover, in FIG. 3A, the file size is 64000B. Here, it is assumed that the size of one cluster is 16384B; thus, the data of "FILE1.TXT" is stored striding over four clusters.

The FATs 305 and 306 have the same number of FAT entries as the number of clusters present in the user data area 302. Each of the FAT entries as entry information serving as a management unit stores a use state of the corresponding cluster and information on link between the clusters.

An example of FIG. 3B shows that "0x000B (11)" is stored as a FAT entry value for cluster number 10 and a cluster with cluster number 10 is linked to a cluster with cluster number 11. Similarly, cluster number 11 with "0x000C (12)" as its FAT entry value is linked to a cluster with cluster number 12, cluster number 12 with "0x000D (13)" as its FAT entry value is linked to a cluster with cluster number 13, and cluster number 13 stores "0xFFFF" stored as its FAT entry value.

The "0XFFFF" in the FAT entry value indicates the end of the file; therefore, the data of "FILE1.TXT" is stored striding over the four clusters with cluster numbers 10, 11, 12, and 13. Moreover, as a FAT entry value for cluster number 14, "0x0000" is stored. The "0x0000" in the FAT entry value means an empty cluster; therefore, no valid data is stored in cluster number 14.

The user data area 302 stores contents of file data, and in an example of FIG. 3C, contents of the data of "FILE1.TXT" is recorded in the four clusters with cluster numbers 10, 11, 12, and 13. That is, to record file data by using the FAT file system, it is required to record the file data into the user data area 302 and also at the same time record the directory entry 401 and the FATs 305 and 306.

Here, assume a case where, by using a portable movie or the like, moving image data is recorded in real time into an information recording medium managed by the FAT file system. In recording data requiring such real time performance, a speed at which the moving image data is inputted and a speed at which it is recorded differ from each other; thus, when the speed of data input is faster than that of data record, an overflow may occur in a buffer temporally saving the input data, thus stopping the data recording. To prevent this, it is required to perform recording to the information recording medium at higher speed than the generation speed of input data.

An information recording medium such as a flash memory, hard disk, or optical disk, however, has a characteristic of data writing time as described above. And, when recording in small units continues, the speed of recording into the information recording medium may become lower than the speed of input data generation. The real time data recording may result in stopping.

Suggested as a conventional method to solve such a problem is a method of separately using a free recording area of a long area length and a free recording area of a short area length in accordance with the speed required for data reading and writing (Patent Document 1). In this method, when high-speed recording of real time data or the like is required, recording into the free recording area of a long area length is performed to achieve the high-speed recording, while for data such as a still image that can be recorded even at a relatively low speed, recording to the free recording area of a short area length is performed. Such separate use achieves effective use of the recording areas while insuring the real time performance.

Patent Document 1: Japanese Unexamined Patent Publication No. Hei 9-251407

DISCLOSURE OF INVENTION

Problem to be Solved by the Invention

First, referring to FIGS. 2 and 4, procedures of processing for recording real time data will be described. FIG. 4 is a flowchart showing a flow of processing for recording real time data in an access device. The processing in this flow is carried out mainly by a file system control part in the access device. In actual reading and writing from and into a memory card, the file system control part sends a command to an access control part to execute the data reading and writing.

In the processing for recording real time data, a directory entry is read first (S701). The directory entry is stored in an area of the RDE 307 in the file system management information 301 or a partial area of the user data area 302 shown in FIG. 2. Next, with reference to the read directory entry, a cluster number storing head data in a file for recording real time data is identified (S702).

Next, the FATs 305 and 306 are read and the links on a FAT starting with the cluster number identified in S702 is followed to acquire a cluster number at a writing position (S703). Next, it is checked whether or not a new free recording area needs to be acquired for the real time data recording (S704). When it has been judged that a new free area needs to be acquired, for example, in a case of additional writing to a file end, area acquisition processing for searching for a free recording area on the FAT and assigning one cluster is performed (S705). Details of the area acquisition processing will be described below.

When it has been judged in S704 that a free recording area does not need to be acquired, or when the acquisition of a free recording area has been completed in S705, the real time data is written into a targeted cluster (S706). Next, the total volume of real time data already written into a memory card 2 is checked to determine whether or not writing of all the data to be recorded has been completed (S707). When the writing has not been completed, the processing returns to S703. When the writing has been completed, to reflect the link relationship between the clusters which has been changed following the real time data recording, the FATs 305 and 306 on an information recording medium are updated (S708). Finally, to reflect the file size, a time stamp, etc., the directory entry on the memory card 2 is updated (S709).

Next, the area acquisition processing performed in S705 of FIG. 4 will be described, referring to FIG. 5. First, a search start cluster number (START_CLU) on the FAT is substituted for a value of a reference cluster number (CURRENT_CLU) currently referenced (S801). The search start cluster number is a variable number also used in controlling the file system of the access device. As a specific value, cluster number "2" indicating the top of the user data area 302 is set as a value of the search start cluster number at the time of mounting the memory card. Various other possible methods include: for example, holding in an access device a cluster number at which the last file access was performed and then setting it as the search start cluster number at the time of mounting.

Here, a description is given, assuming a case where "2" is set as a value of the search start cluster number at the time of mounting. In this case, in the processing of S801, "2" is substituted for the value of the reference cluster number in the same manner. Next, with reference to an FAT entry value which is present on the FATs 305 and 306 and corresponds to the reference cluster number, it is checked if the value is "0x0000" (S802).

If the value is "0x0000", the cluster with the reference cluster number is a free recording area, and thus the area acquisition has succeeded. Thus, the value of the search start cluster number is updated to the number indicated by the reference cluster number, and the cluster indicated by the reference cluster number is used as an empty cluster, then ending the processing (S803 and S804).

Here, an update of the search start cluster number in S803 is performed as follows. If the reference cluster number is the number of the last cluster (LAST_CLU) of the user data area 302, "2" is substituted for the value of the search start cluster number. In other cases, a value obtained by adding 1 to the reference cluster number is substituted for a value of the search start cluster number.

Moreover, in the processing of S804, the FAT entry value corresponding to the reference cluster number is set at "0xFFFF" indicating that it is in use. Along therewith, when already recorded data is present in the file prior to the real time data to be recorded and the real time data is added following this data, the FAT entry value corresponding to the cluster number at a position where the already recorded data is present is changed and set to a value indicating the reference cluster number.

Moreover, if the FAT entry value corresponding to the reference cluster number is not "0x0000" in the determination processing of S802, it is checked whether or not at least either one of the following conditions is satisfied (S805):

(1) the value of the reference cluster number is a value smaller than the value of the search start cluster number by only 1; and (2) the value of the reference cluster number indicates the last cluster, and a value of the search start cluster number is "2".

When either of the conditions described above has been satisfied, checking of all the FAT entry values has been already completed and no free recording area is present, and thus the area acquisition has failed. Accordingly, the series of area acquisition processing ends, whereby the real time data recording stops (S806). Moreover, if neither of the conditions has been satisfied in the processing of S805, it is determined whether or not the reference cluster number is equal to the number of the last cluster of the user data area 302 (S807). If they are equal to each other, "2" is substituted for the value of the reference cluster number, and the processing returns to S802 (S808). If they are different from each other, "1" is added to the value of the reference cluster number, and similarly, the processing returns to S802 (S809).

In the area acquisition processing in a conventional access device described above, all the FAT entry values present on the FATs are sequentially searched, and a firstly identified empty cluster is used for the real time data recording.

In the conventional real time data record processing indicated above, the area acquisition is not performed with any consideration given to the time required for the FAT update, i.e., the recording and update of the directory entry, the FATs 305 and 306, etc. Even when acquired free recording areas have a long area length, if they are arranged on the logical address space in a distributed manner, there may arise a difference between a data input speed and a data recording speed, resulting in failure to maintain the real time performance.

The problem encountered in this conventional record processing will be described below, by referring to the drawings. FIG. 6 is a drawing showing one example of a data recording position on a logical address space in the FAT file system. Assumed here is a case where an area of 256 kB in total with 16 consecutive 16 kB-clusters is managed as one recording unit as a free recording area of a long area length in the conventional method. The file system management information area 301 is an area of 512 kB with 32 consecutive 16 kB-clusters, and the user data area 302 is an area of 1023488 kB with 3998 consecutive 256 kB-recording units. FIG. 6 shows a case where three recording units with cluster numbers from 4994 to 5041 are free areas and file data is recorded into these areas.

FIG. 7 shows the buffer usage amount in the access device and timing of recording into the information recording medium in this case. In FIG. 7, A denotes an already used amount as an initial state of the buffer and B denotes a maximum value of data amount storable in the buffer. An excess of the buffer usage over the maximum value B causes buffer overflow, stopping the real time data recording.

In the cases of FIGS. 6 and 7, after three pieces of 256 kB-data are recorded into areas with cluster numbers from 4994 to 5041, the FATs 305 and 306 and the directory entry 401 are updated. Here, the areas with cluster numbers 4994 to 5041 are consecutive; thus, an FAT entry positions on the FATs are also adjacent to each other, and 512B-update of either of the FATs 305 and 306 updates link information of all the three pieces of data described above. In this case, it is only required to perform update once on each of the FATs 305 and 306 and on the directory entry 401 with respect to recording 768 kB-data in total; thus, the buffer usage never exceeds the maximum value B, which permits continuing the real time recording.

On the other hand, three free areas in units of 256 kB are dispersed on the logical address space in a non-consecutive manner in cases of FIGS. 8 and 9; therefore, the FATs 305 and 306 and the directory entry 401 are updated each time data of 256 kB is recorded into the free area. Here, the FATs 305 and 306 and the directory entry 401 each are updated three times. Extra two updates of the FATs 305 and 306 and the directory entry 401 are performed during recording of the same 768 kB-data. The data recording stops during these two, resulting in a decrease in the substantial data recording speed. An input data generation, however, is generated at substantially constant speed, which may cause buffer overflow, thereby stopping the real time data recording.

A possible method for solving this problem is to change the recording unit from 256 kB to 768 kB. However, it is not an effective method, because free recording areas are likely to be distributed on an information recording medium such as a memory card or hard disk where file generation and deletion are repeated with considerably high frequency, which results in difficulties in assuring even larger consecutive recording areas.

In view of the problem described above, it is an object of the present invention to provide a information recording medium access device and a data recording method that, on an information recording medium managed by a file system, reduces the number of updates of FATs, etc. to ensure the real time performance during recording without relying on the arrangement state of free recording areas.

Means to Solve the Problems

To solve the problems, an information recording medium access device according to the present invention for accessing an information recording medium managing stored data by a file system, comprises: an area management block control part for dividing area management information managed by the file system into units of blocks of a fixed length, generating, on a memory inside the information recording medium access device, area management block information storing information related to a length of a free area included in each of the blocks of a fixed length, and using the information stored in said area management block information for area assignment at a time of file data recording.

To solve the problems, an information recording medium access device according to the present invention for accessing an information recording medium including a nonvolatile memory having a data recording area composed of a collection of a plurality of clusters each serving as a management unit and area management information holding a plurality of pieces of entry information each serving as one management information unit for each of said clusters, wherein said area management information has a plurality of area management blocks each composed of a certain number of pieces of said entry information so combined as to obtain a certain number of physically consecutive clusters in said data recording area, comprises: an area management block control part for reading said area management information from said information recording medium, calculating the number of empty clusters for each of said area management blocks, comparing said number of empty clusters of each of said area management blocks with a first threshold value, and when said number of empty clusters is larger than or equal to the first threshold value, providing the area management block as an area into which data can be written; and a memory for holding area management block information related to each of said area management blocks and to a length of a free area in the respective area management blocks.

Said area management block control part may store, as said area management block information into said memory: a value indicated by said number of empty clusters in said area management block; and a flag indicating that the recording area managed by the area management block can be used, when said number of empty clusters in said area management block is larger than or equal to the first threshold value, or a flag indicating that the recording area managed by said area management block cannot be used, when said number of empty clusters in said area management block is smaller than said first threshold value.

Said first threshold value may be the number of clusters that permits recording of file data required to be necessarily recorded during (t−1)-number of data recordings sandwiched between consecutive t-number of updates of file system management information.

Said area management block control part may manage, for each of said area management blocks, a combination of two or more pieces of said entry information as one set so as to obtain two or more physically consecutive clusters in said data recording area, compare the number of clusters included in the set whose clusters indicated by the entry information thereof are all free areas with said first threshold value, and when said number of empty clusters is larger than or equal to said first threshold value, provide the recording area managed by the corresponding area management block as a data-recordable area.

Said area management block control part may store as said area management block information into said memory: a value indicated by said number of empty clusters in said area management block; and a flag indicating that the recording area managed by the area management block can be used, when said number of empty clusters in said area management block is larger than or equal to the first threshold value, or a flag indicating that the recording area managed by said area management block cannot be used, when said number of empty clusters in said area management block is smaller than said first threshold value.

Said area management block control part may manage, for each of said area management blocks, a combination of two or more pieces of said entry information as one slot, determine the slot as a free slot when the number of empty clusters among the clusters included in each slot is larger than or equal to a second threshold value, compare the number of empty clusters included in all the empty slots in said area management block with said first threshold value, and, when said number of empty clusters is larger than or equal to said first threshold value, provide the recording area managed by the corresponding area management block as an area into which data can be recorded.

Said area management block control part may store, as said area management block information into said memory: a value indicated by said number of empty clusters in said area management block; and a flag indicating that the recording area managed by the area management block can be used, when said number of empty clusters in said area management block is larger than or equal to the first threshold value, or a flag indicating that the recording area managed by said area management block cannot be used, when said number of empty clusters in said area management block is smaller than said first threshold value.

Said area management block control part may refer to said area management block information held in said memory, and assign, at time of file data recording, a free area included in said area management block whose said free area length is larger than or equal to a certain value.

To solve the problems, a data recording method comprises steps of: dividing area management information managed by a file system into units of blocks of a fixed length; generating, on a memory inside an information recording medium access device, area management block information storing information related to a length of a free area included in each of the blocks of a fixed length; and using the information stored in said area management block information for area assignment at a time of file data recording.

To solve the problems, a data recording method for accessing an information recording medium including a nonvolatile memory having a data recording area composed of a collection of a plurality of clusters each serving as a management unit and area management information holding a plurality of pieces of entry information each serving as one management information unit for each of said clusters, wherein said area management information has a plurality of area management blocks each composed of a certain number of pieces of said entry information so combined as to obtain a certain number of physically consecutive clusters in said data recording area, comprises steps of: reading said area management information from said information recording medium, calculating the number of empty clusters for each of said area management blocks, comparing said number of empty clusters of each of said area management blocks with a first threshold value, and when said number of empty clusters is larger than or equal to the first threshold value, providing the area management block as an area into which data can be written; and holding into a memory area management block information related to each of said area management blocks and to a length of a free area in the respective area management blocks.

The data recording method may further comprise a step of storing, as said area management block information into said memory: a value indicated by said number of empty clusters in said area management block; and a flag indicating that the recording area managed by the area management block can be used, when said number of empty clusters in said area management block is larger than or equal to the first threshold value, or a flag indicating that the recording area managed by said area management block cannot be used, when said number of empty clusters in said area management block is smaller than said first threshold value.

Said first threshold value may be the number of clusters that permits recording of file data required to be necessarily recorded during (t−1)-number of data recordings sandwiched between consecutive t-number of updates of file system management information.

The data recording method may further comprise steps of: managing, for each of said area management blocks, a combination of two or more pieces of said entry information as one set so as to obtain two or more physically consecutive clusters in said data recording area; comparing, with said first threshold value, the number of clusters included in a set whose clusters indicated by the entry information thereof are all free areas; and providing the recording area managed by the corresponding area management block as an area into which data can be recorded when said number of empty clusters is larger than or equal to said first threshold value.

The data recording method may further comprise a step of storing, as said area management block information into said memory: a value indicated by said number of empty clusters in said area management block; and a flag indicating that the recording area managed by the area management block can be used, when said number of empty clusters in said area management block is larger than or equal to the first threshold value, or a flag indicating that the recording area managed by said area management block cannot be used, when said number of empty clusters in said area management block is smaller than said first threshold value.

The data recording method may further comprise steps of: managing, for each of said area management blocks, a combination of two or more pieces of said entry information as one slot; determining the slot as an free slot when the number of empty clusters among the clusters included in each slot is larger than or equal to a second threshold value; comparing the number of empty clusters included in all the empty slots in said area management block with said first threshold value; and providing the recording area managed by the corresponding area management block as an area into which data can be recorded when said number of empty clusters is larger than or equal to said first threshold value.

The data recording method may further comprise a step of storing, as said area management block information into said memory: a value indicated by said number of empty clusters in said area management block; and a flag indicating that the recording area managed by the area management block can be used, when said number of empty clusters in said area management block is larger than or equal to the first threshold value, or a flag indicating that the recording area managed by said area management block cannot be used, when said number of empty clusters in said area management block is smaller than said first threshold value.

The data recording method may further comprise steps of: referring to said area management block information held in said memory; and assigning, at time of file data recording, a free area included in said area management block whose said free area length is larger than or equal to a certain value.

Effectiveness of the Invention

According to the present invention, in recording real time data into an information recording medium managed by a file system, it is possible to ensure the real time performance during recording without regard to the arrangement state of free recording areas.

BRIEF DESCRIPTION OF DRAWINGS

FIG. 3A is an explanatory diagram showing one example of a directory entry in the FAT file system.

FIG. 3B is an explanatory diagram showing one example of a FAT in the FAT file system.

FIG. 14 is an explanatory diagram showing one example of the area management block information in the embodiment of the present invention.

FIG. 19A is a flowchart showing the generation processing of the area management block information in the embodiment of the present invention.

FIG. 21 is a diagram showing relationship between respective values in a generation processing for area management block information according to the embodiment of the present invention.

FIG. 22A is a diagram showing recording units each composed of a plurality of clusters, and slots in the embodiment of the present invention.

FIG. 22B is a diagram showing recording units each composed of a plurality of the clusters, and the slots in the embodiment of the present invention.

EXPLANATION OF REFERENCE NUMERALS

Figure 1:
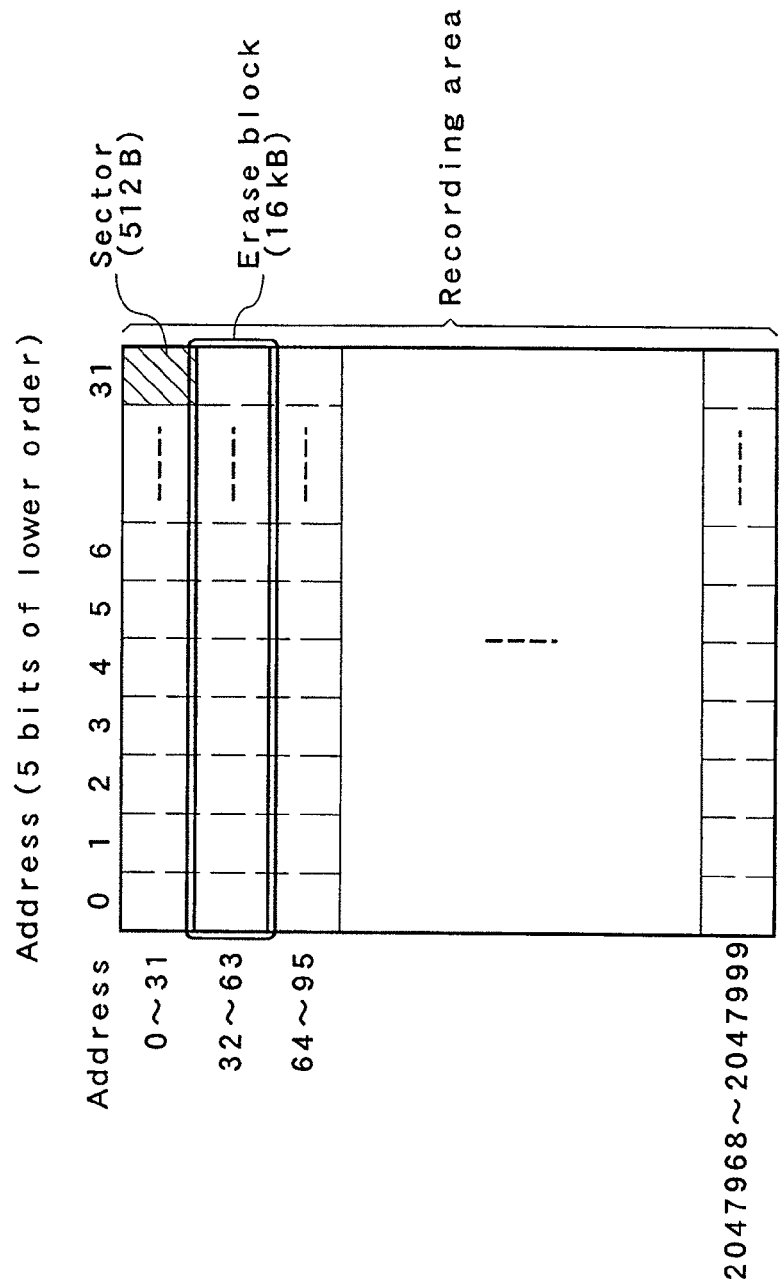
FIG. 1 is an explanatory diagram showing one example of relationship between erase blocks and sectors in a flash memory.
Figure 2:
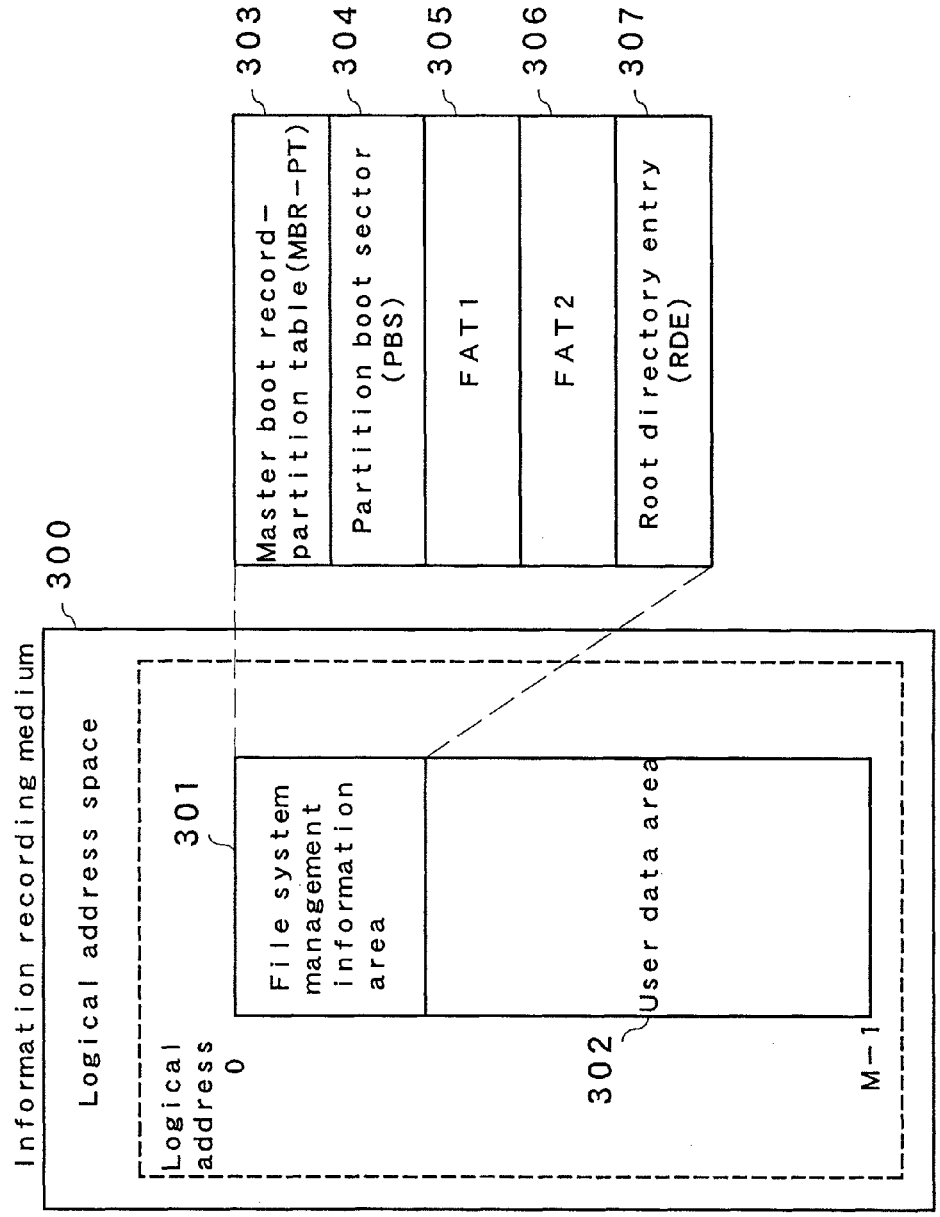
FIG. 2 is an explanatory diagram showing a configuration of an FAT file system.
Figure 3C:
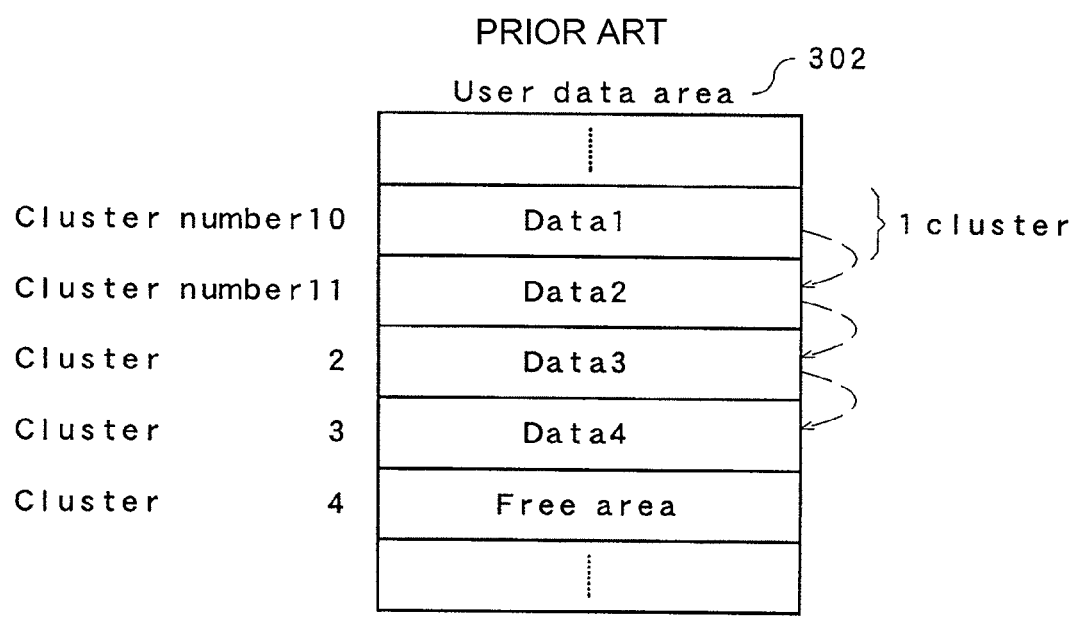
FIG. 3C is an explanatory diagram showing one example of a user data area in the FAT file system.
Figure 4:
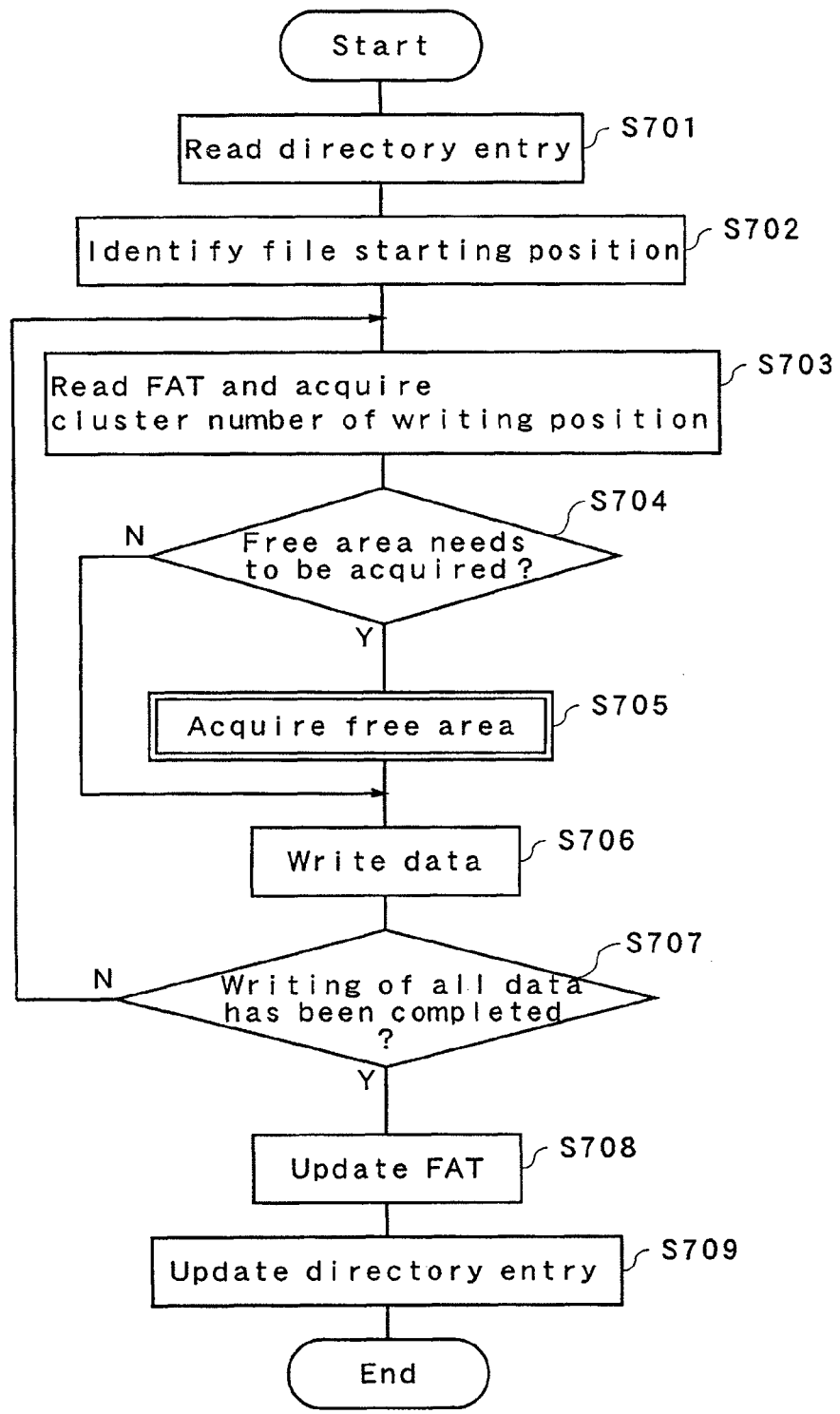
FIG. 4 is a flowchart showing record processing for real time data in a conventional access device.
Figure 5:
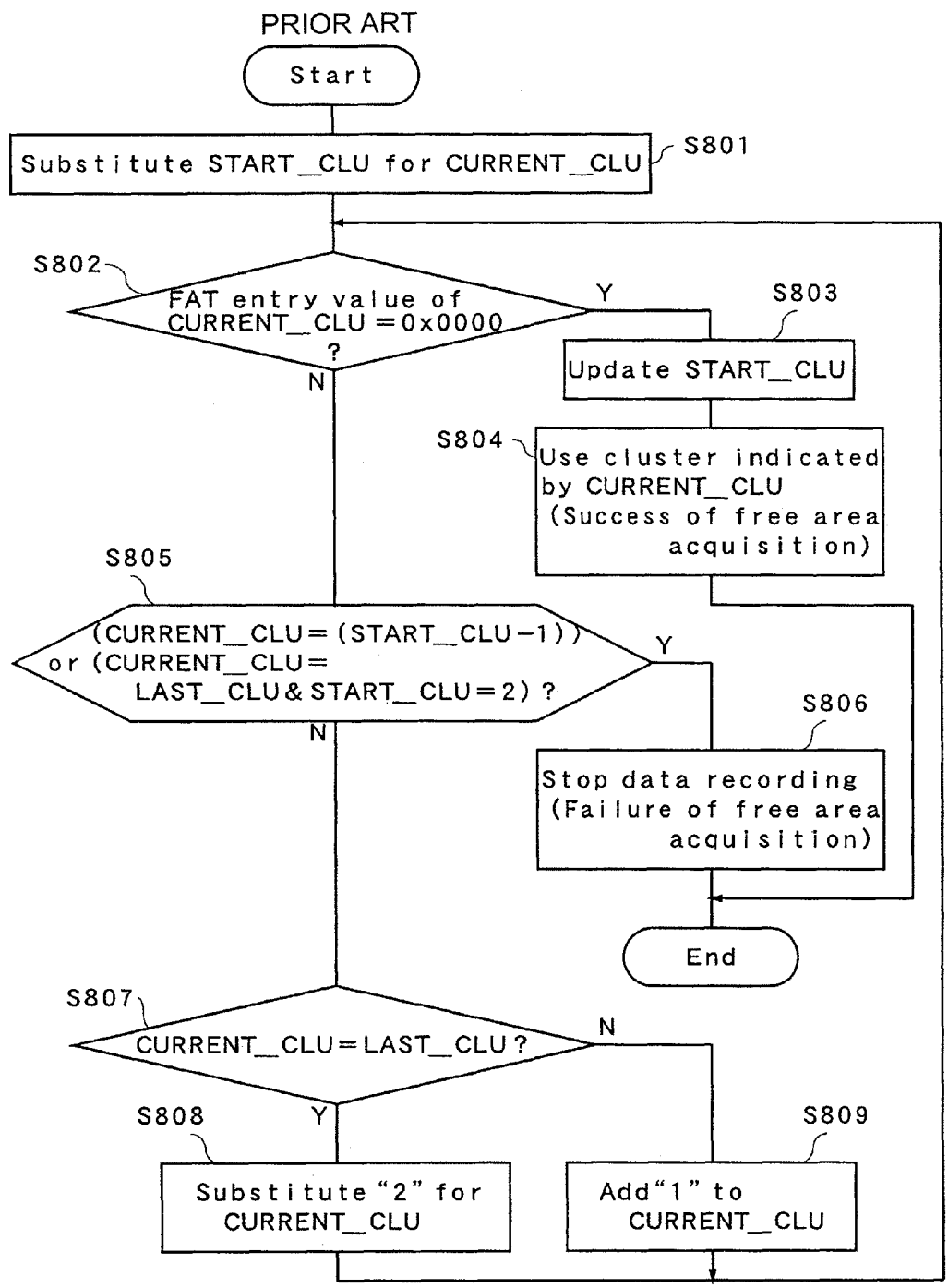
FIG. 5 is a flowchart showing free area acquisition processing in the conventional access device.
Figure 6:
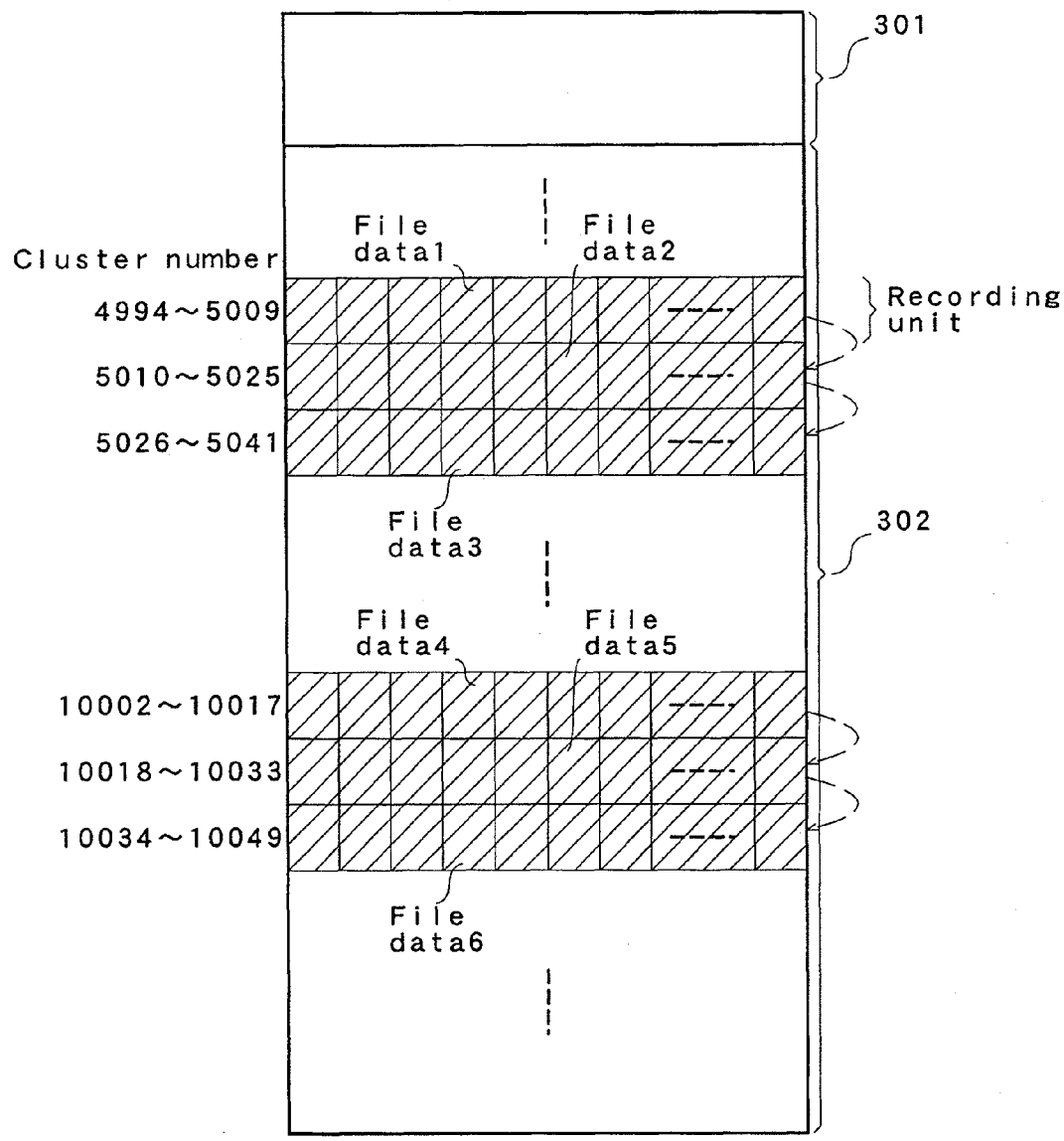
FIG. 6 is an explanatory diagram showing one example of data recording position in the FAT file system.
Figure 7:
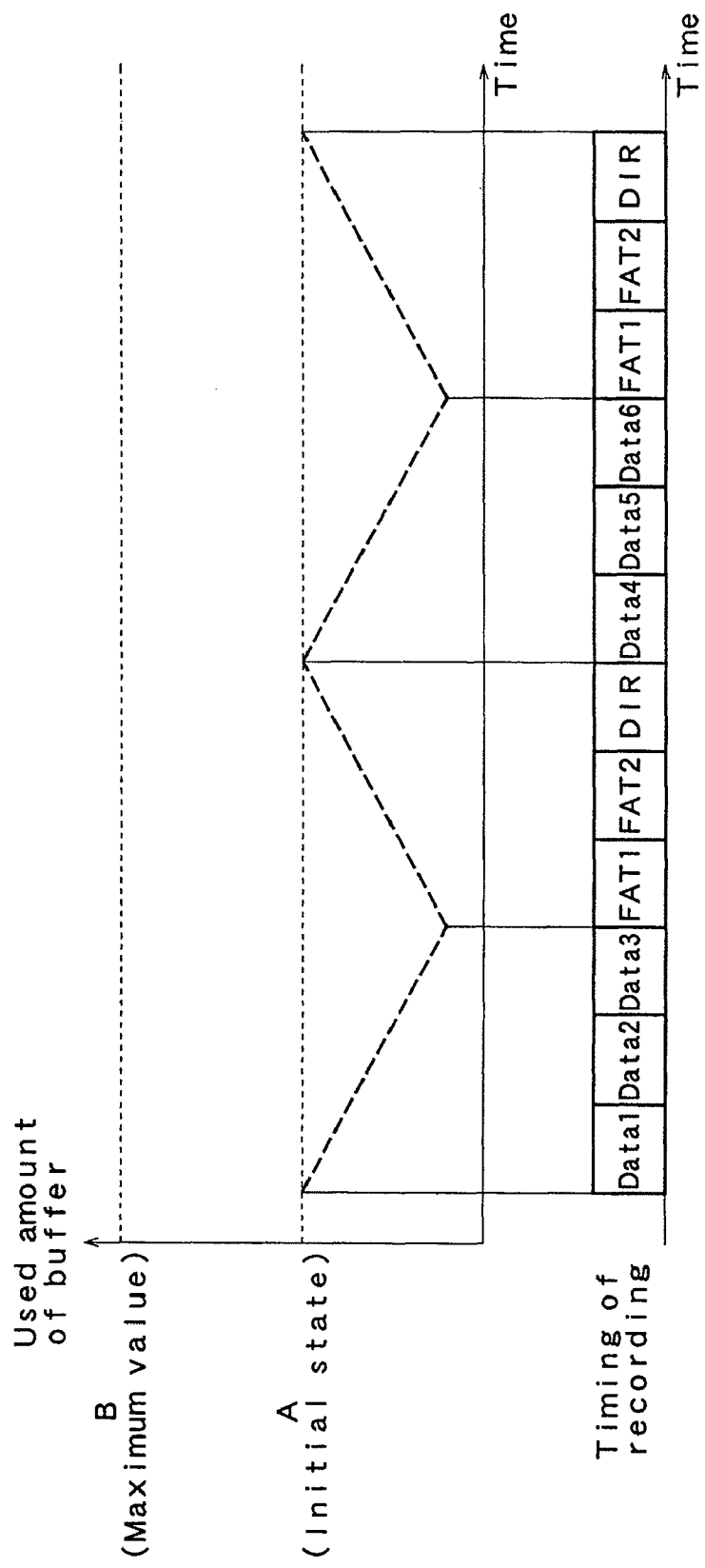
FIG. 7 is an explanatory diagram showing one example of an amount of buffer usage in the access device and timing of recording to an information recording medium.
Figure 8:
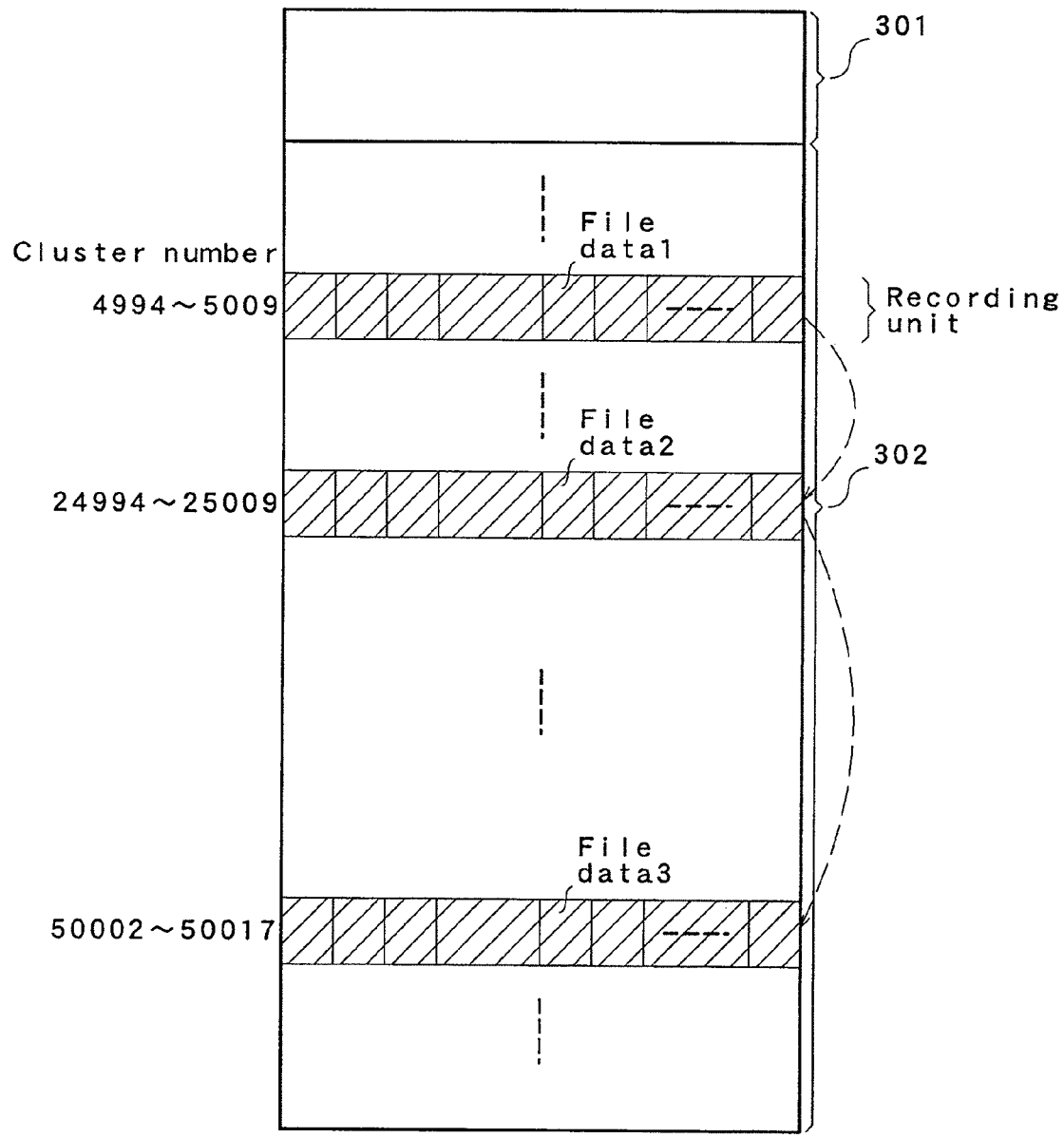
FIG. 8 is an explanatory diagram showing one example of data recording position in the FAT file system.
Figure 9:
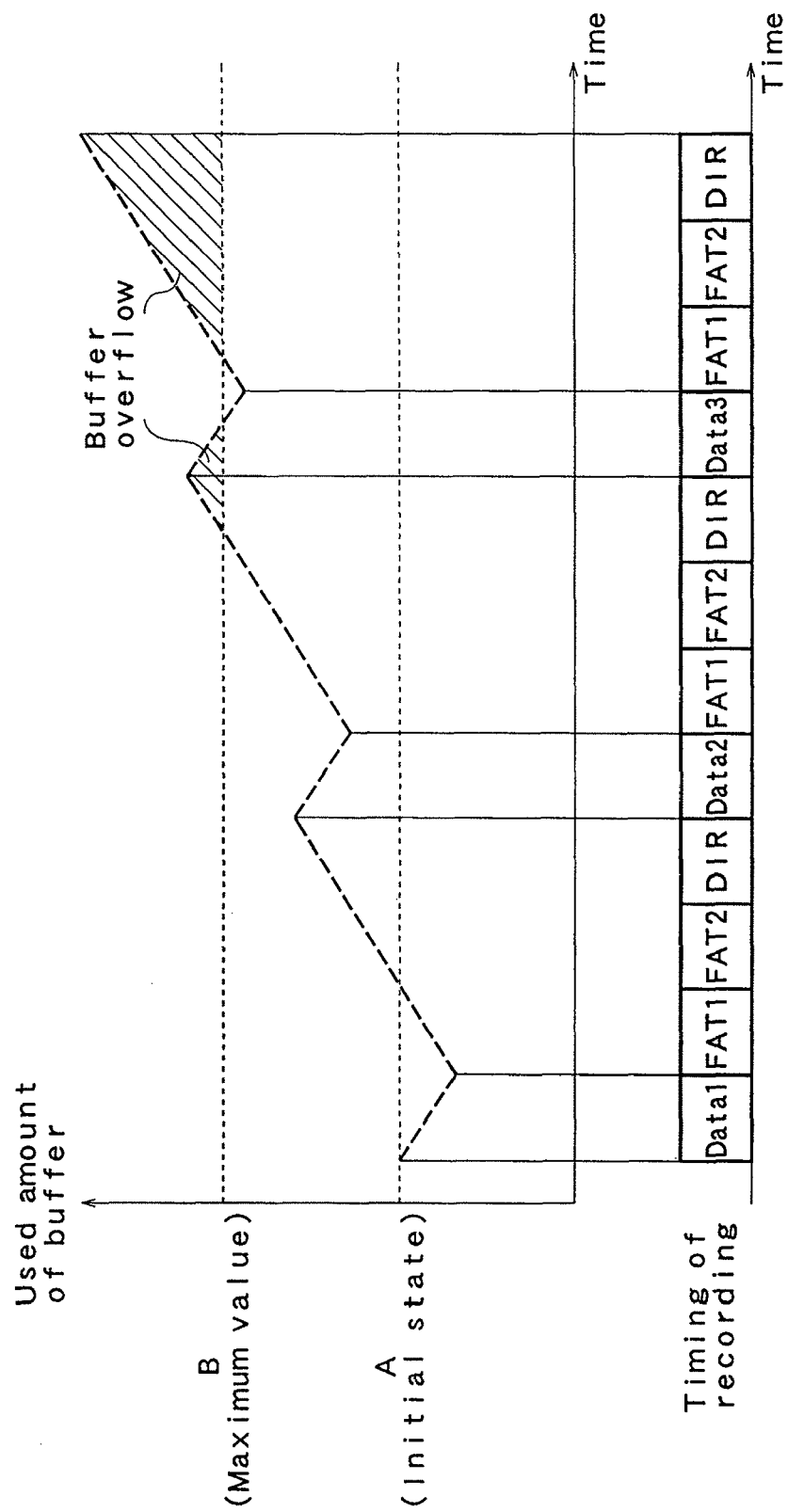
FIG. 9 is an explanatory diagram showing one example of the amount of buffer usage in the access device and timing of recording to an information recording medium.

1 Access device
2 Memory card
11, 22 CPU
12, 23 RAM
13 Connector
14, 24 ROM
15 Application control part
16 File system control part
17 Access control part
18 Area management block control part
19 Area management block information
21 Host IF part
25 Nonvolatile memory
301 File system management information area
302 User data area
303 Master boot record-partition table (MBR-PT)
304 Partition boot sector
305, 306 FAT
307 Root directory entry
401 Directory entry

BEST MODE FOR CARRYING OUT THE INVENTION

Figure 10:
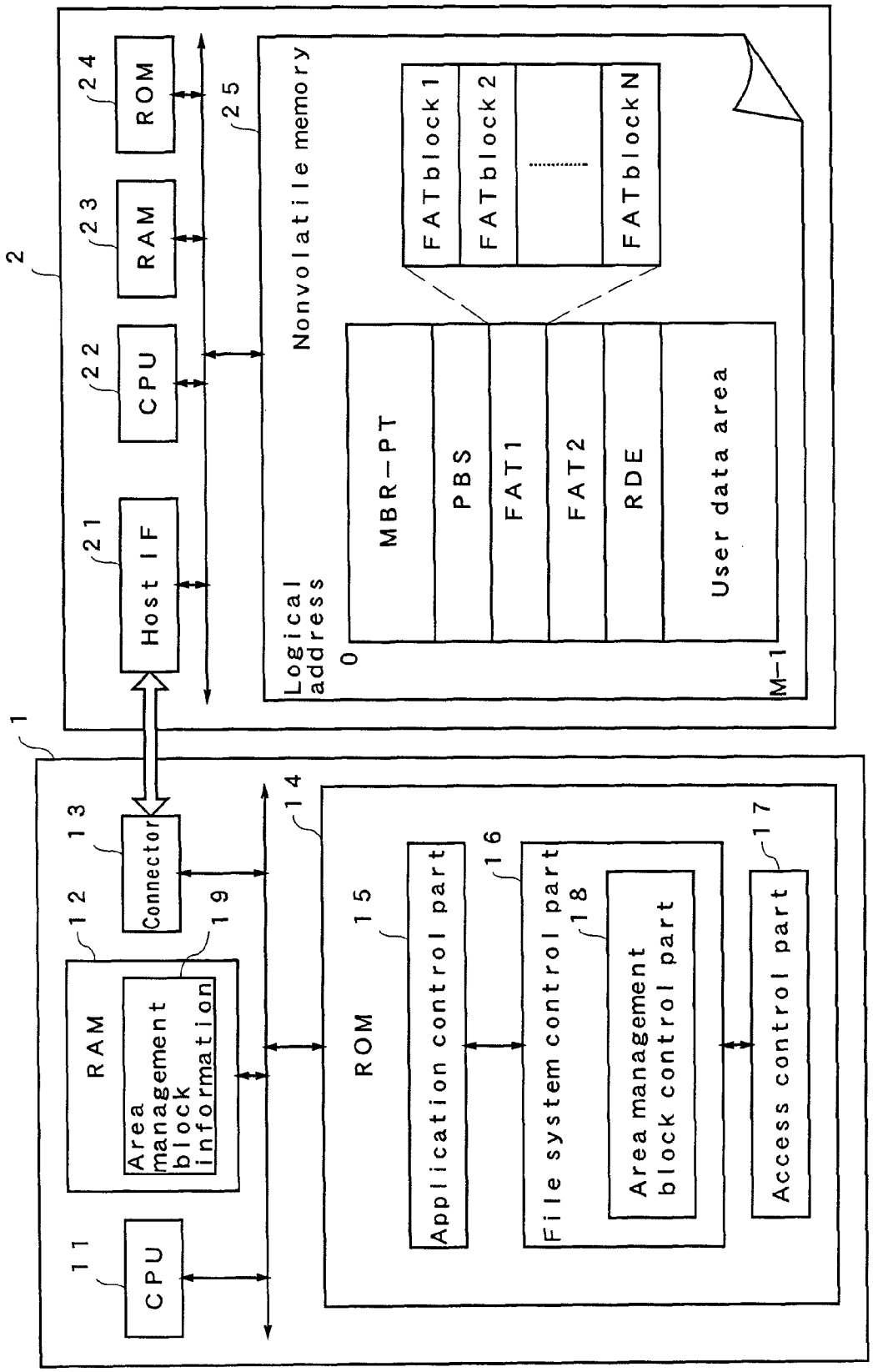
FIG. 10 is an explanatory diagram showing an information recording medium access device and a memory card in an embodiment of the present invention.

Hereinafter, an embodiment of the present invention will be described, referring to the drawings. The present embodiment will be described, referring to a case for example where a memory card managed by a FAT file system is used as an information recording medium. FIG. 10 is a configuration diagram of an information recording medium access device 1 (hereinafter referred to as access device 1) and a memory card 2 as an information recording medium in an embodiment of the present invention. The access device 1 includes a CPU 11, RAM 12, connector 13, and ROM 14.

The connector 13 is a connection part between the access device 1 and the memory card 2. Various commands for reading, writing, etc. and data are transmitted and received via this connector 13. The ROM 14 stores programs for controlling the access device 1, and the programs use the RAM 12 as a temporary storage area and operate on the CPU 11.

The ROM 14 includes an application control part 15, not shown in FIG. 10, for controlling all services provided to the user from the access device 1, including control of input devices such as a touch panel and keyboard, control of output devices such as an LCD and speaker, control of reproduction of AV data stored in the memory card 2, and control of recording of AV data into the memory card 2. Moreover, the ROM 14 also includes: a file system control part 16 for controlling a file system built on a nonvolatile memory 25 of the memory card 2; and an access control part 17 for transmitting and receiving commands to and from the memory card 2.

The file system control part 16 further includes an area management block control part 18 for managing FAT 1 and FAT 2 in units of blocks of a fixed length and for controlling a free recording area. The area management block control part 18 generates, on the RAM 12 as a memory, area management block information 19 storing information indicating a free recording area length and validity of each of FAT blocks of a fixed length into which the FAT 1 and FAT 2 are divided, and uses this for management of the free area.

Moreover, the memory card 2 of FIG. 10 includes a host IF 21, CPU 22, RAM 23, ROM 24, and nonvolatile memory 25. The host IF 21 is an interface for transmitting and receiving various commands and data to and from the access device 1.

The ROM 24 stores program for controlling the memory card 2. The programs use the RAM 23 as a temporary storage area and operate on the CPU 22. Moreover, the nonvolatile memory 25 is a memory storing and holding user data inputted from the access device 1, and a semiconductor memory such as a flash memory is used as a recording device. Moreover, in a recording area of this nonvolatile memory 25, a file system is built with a master boot record-partition table (MBR-PT), partition boot sector (PBS), FAT 1, FAT 2, and root directory entry (RDE) as file system management information. The access device 1 manages user data in units of files in accordance with this file system.

Next, processing in the access device 1 of the present embodiment at the time of inserting the memory card 2 will be described, referring to FIGS. 11 to 14. Further, the characteristics of the present embodiment, i.e., the area management block control part 18 and area management block information 19 generated on the RAM 12 will be described in detail.

Figure 11:
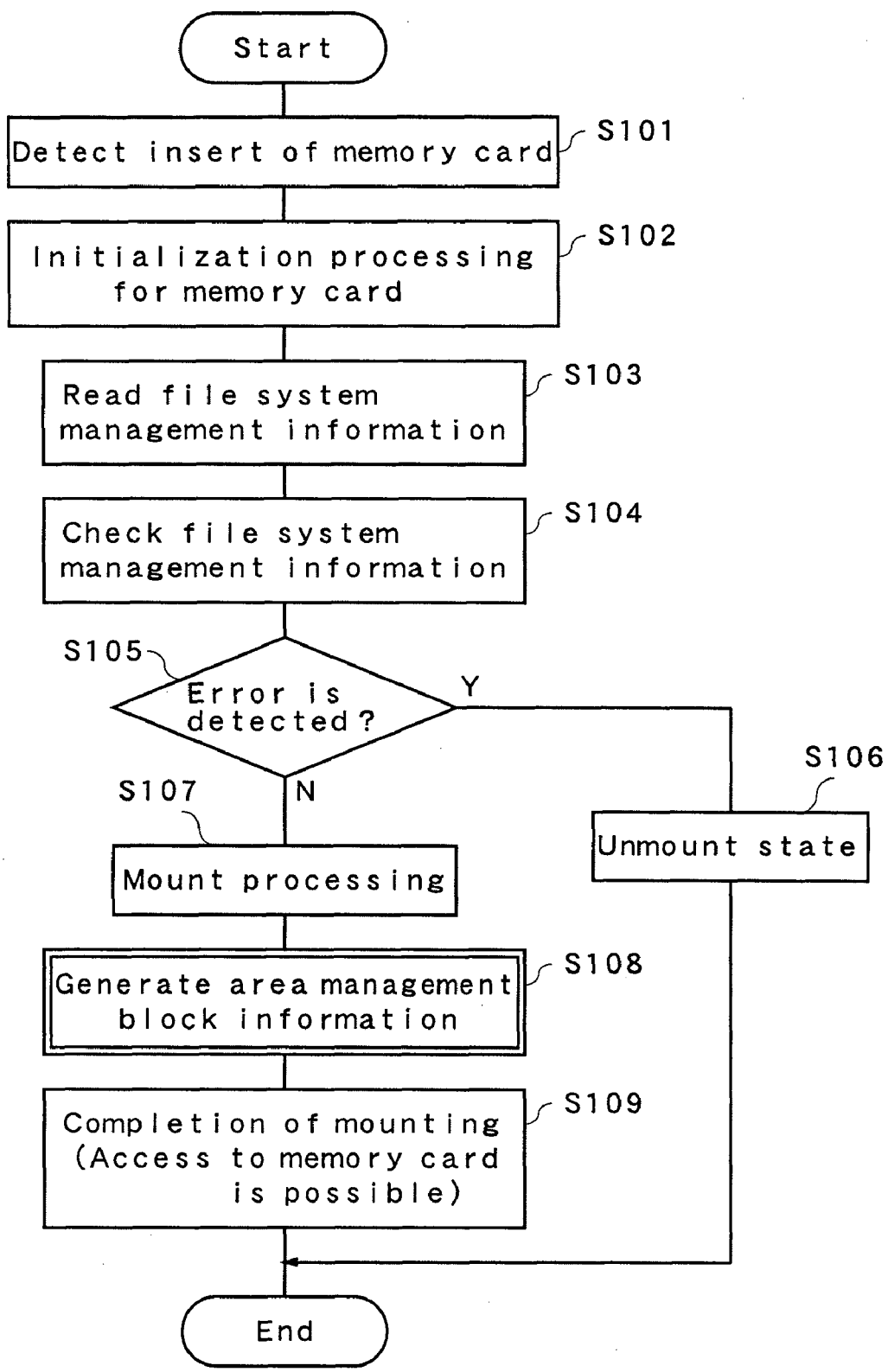
FIG. 11 is a flowchart showing a flow of a series of processing at the time of memory card insertion in the access device according to the embodiment of the present invention.

FIG. 11 shows a flow of a series of the processing in the access device 1 of the present embodiment at the time of inserting the memory card 2. First, upon an insertion of the memory card 2 into the connector 13 of the access device 1, a signal notifying the insertion of the memory card 2 is transmitted to the CPU 11 through a signal line connected to the connector 13, whereby the memory card insertion is detected (S101).

Upon reception of the signal notifying the insertion of the memory card 2, the CPU 11 activates the access control part 17 and carries out processing for initializing the memory card 2 by a program of the access control part 17 (S102). In this initialization processing, the access device 1 starts power and clock supplies to the memory card 2 and inputs an initialization command to the memory card 2. The memory card 2, which has received the initialization command, starts power supply to the nonvolatile memory 25 included therein. Thereafter, preparations for the access device 1 to access the nonvolatile memory 25 of the memory card 2 are made, including recorded data error check and generation of a logical address-physical address conversion table.

Upon completion of the initialization processing, the memory card 2 informs the access device 1 of the completion of the initialization. Next, in the access device 1, the CPU 11 activates a file system control part 16, and reads file system management information from a file system management information area of the nonvolatile memory 25 in the memory card 2 via the access control part 17 (S103). The file system control part 16 checks contents of the read file system management information to check if any error is found in the stored information and if the file system is controllable (S104).

When any error has been found in the file system management information, for example, in a case where the cluster size is set at 0 or a case where an identifier that should be originally stored is not stored, the access device determines its own state as an unmounting state in which no memory card is inserted, and does not perform subsequent processing for the mounting and ends the series of the initialization processing (S105 and S106). In a case where some troubles occur in the file system of the memory card 2, the access device turns into the unmounting state. In this case, unless a proper file system is built through reformatting or otherwise, the access device 1 does not perform mounting processing on the memory card 2, so that the file access processing is not achieved.

Contrarily, if no error has been found in the file system management information, the file system control part 16 carries out the mounting processing for the memory card 2 (S107). In the mounting processing, the file system control part 16 extracts information (addresses where corresponding management information is stored, cluster sizes, etc.) required for an access to the file system of the memory card 2, and holds it on the RAM 12.

Next, the CPU 11 activates the area management block control part 18 and generates the area management block information 19 (S108). Details of the processing of S108 will be described later. Finally, upon completion of the generation of the area management block information 19, the access device 1 holds on the RAM 12 a flag indicating that it is in a state in which the memory card is mounted therein, and ends the series of initialization processing (S109). If it is set in the mounted state, by using the information held on the RAM 12 in the mounting processing of S107, the file system built on the memory card 2 can be accessed.

Processing of generating the area management block information 19 in S108 will be described. Used in the area management block information 19 are FAT blocks in units of blocks of a fixed length, for example, 512B into which the FAT 1 and FAT 2 are divided. Generated is information on the length of a free recording area present in a user data area managed by each FAT block and a flag indicating whether or not this free recording area length is larger than or equal to a threshold value, and they are held as the area management block information 19 on the RAM 12. The above is a course of the processing for generating the area management block information 19.

Figure 12:
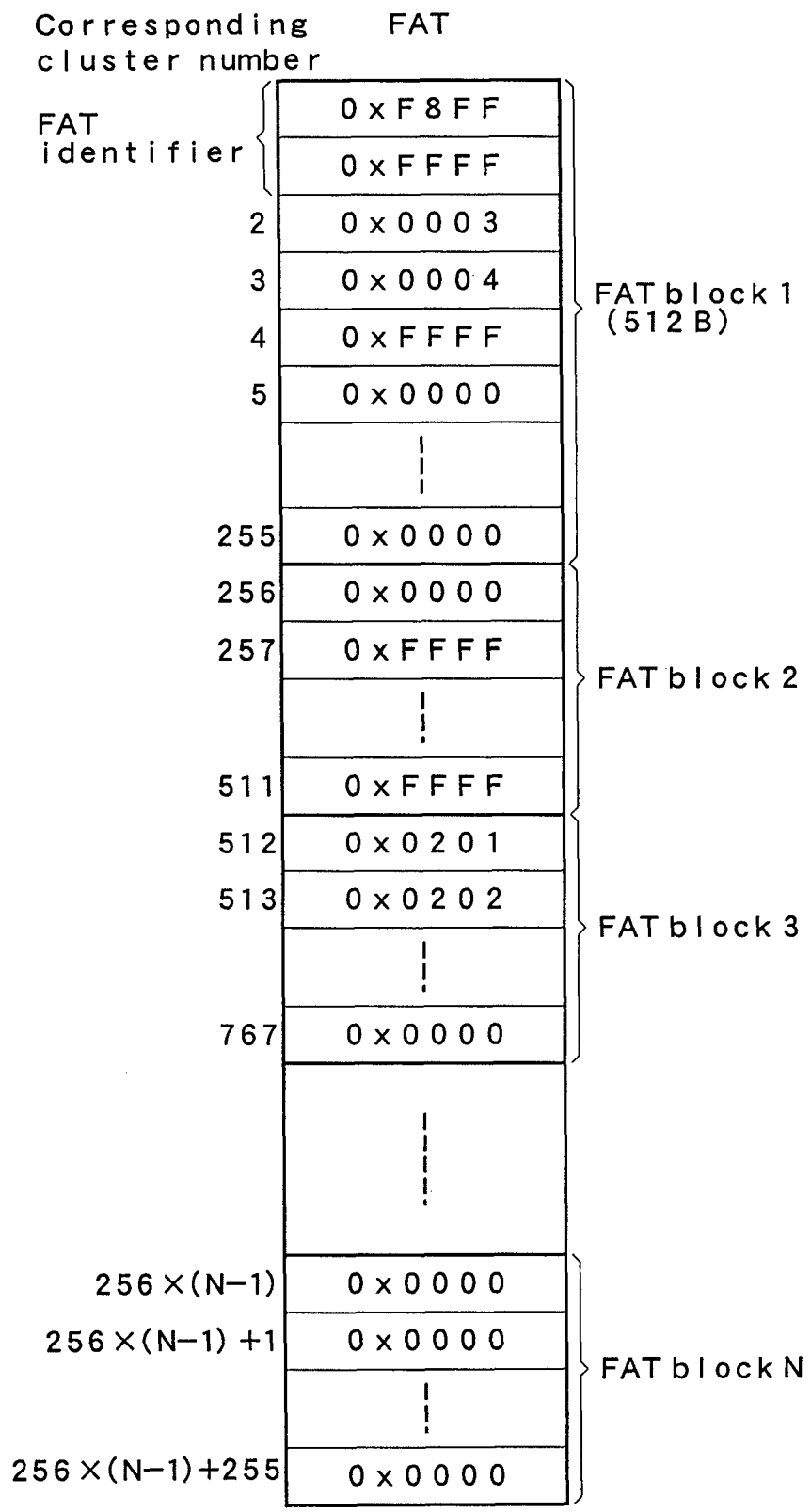
FIG. 12 is an explanatory diagram showing one example of a management unit used in FAT management by an area management block control part in the embodiment of the present invention.

First, a method for managing the FAT 1 and FAT 2 will be described. FIG. 12 is a diagram showing one example of a management unit in the management of the FATs 1 and 2 by the area management block control part 18. Assumed as a file system here is a FAT 16 file system that manages FAT entries in units of 16 bits. It is assumed for each parameter that the cluster size is 16 kB, the FAT block size is 512B, and the FAT size is N×512B. That is, the FAT blocks are made by dividing the FATs into blocks of a fixed length, and the FATs are divided into N-number of FAT blocks.

The area management block control part 18 divides the FAT 1 and FAT 2 in units of FAT blocks in order starting with the top of the table and manages information on lengths of free recording areas. In an example of FIG. 12, FAT entry values included in one FAT block represent information on 256 clusters, and this is equivalent to area management information on a user data area of 4 MB.

The user data area can be divided in units of 4 MB with the FAT blocks. However, the size of the user data area is not limited to multiples of 4 MB in length; therefore, the FAT entries near the end of the FAT block N are not used in practice and the user data areas corresponding thereto are also not used. Further, the two FAT entries present at the tops of the FAT 1 and FAT 2 store an identifier for identifying the FATs, and an area managed by the FAT block 1 serves as a user data area of (4 MB–16 kB×2).

Figure 13:
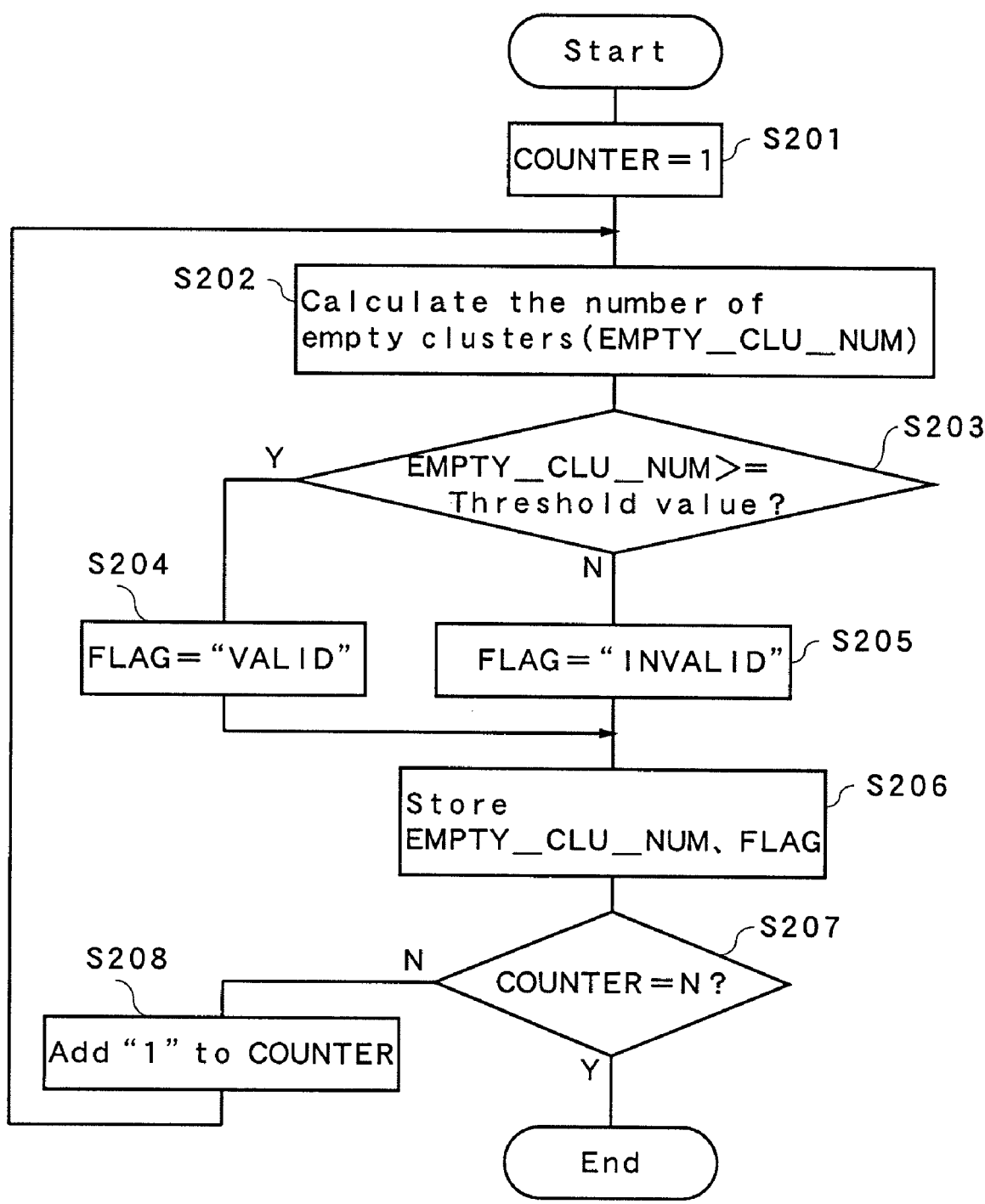
FIG. 13 is a flowchart showing generation processing of area management block information in the embodiment of the present invention.

Next, based on the management method for user data area using the FAT blocks, a flow of processing of generating the area management block information 19 will be described, referring to FIG. 13. In the processing of generating the area management block information 19, a value of COUNTER indicating the number of a FAT block currently referenced is first set at "1" (S201). Next, with reference to the inside of the FAT block 1 corresponding to the number indicated by the value of COUNTER, the number of empty clusters (EMPTY_CLU_NUM) in the FAT block 1 is calculated (S202).

Specifically, a value in a two-byte unit in the FAT block specified by the COUNTER is judged. If the value of the FAT entry is "0x0000", it is determined that the corresponding cluster is empty and counted as one empty cluster. This processing is repeated for all the FAT entries present in the FAT block specified by the value of COUNTER to calculate a total number of empty clusters present in the FAT block.

In this case, if the value of COUNTER is "1", without reference to the top two FAT entries, the aforementioned judgment in units of two bytes is performed on all the FAT entries included in the remaining portion to calculate the number of empty clusters. Moreover, if the value of COUNTER is "N", the aforementioned judgment is performed on the remaining valid FAT entries excluding the FAT entries, near the end, not actually used in the FAT block N to calculate the number of empty clusters.

Next, when the number of empty clusters has been determined, it is judged whether or not this value is larger than or equal to a threshold value (S203). Although details of the threshold value will be described later, a case where the threshold value is set at "100" will be described here as one example. If the number of empty clusters is larger than or equal to "100", it is larger than or equal to the threshold value, and thus a flag (FLAG) indicating the validity of the FAT block is set as "VALID" (S204). If the number of empty clusters is smaller than "100", it is smaller than the threshold value, and thus the flag is set as "INVALID" (S205).

Next, into the area management block information 19, the calculated number of empty clusters and the value of the flag are stored as information on the FAT block corresponding to the COUNTER (S206). Following this, if the value of COUNTER is "N", the processing on all the FAT blocks has been completed, and thus the processing ends without returning to S202 (S207). If the value of COUNTER is not "N", "1" is added to the value of COUNTER, and the processing returns to S202 (S208).

FIG. 14 shows one example of the area management block information 19 generated in this manner. The area management block information 19 is composed of information on the number of FAT blocks ("N" in this example), and stores, for each FAT block, the number of empty clusters and a flag included in the FAT block.

The example in FIG. 14 assumes "100" as the threshold value employed for judging the validity of the FAT blocks. "INVALID" flags are stored based on that the number of empty clusters for the FAT blocks 3 and 4 are both smaller than "100".

Figure 15:
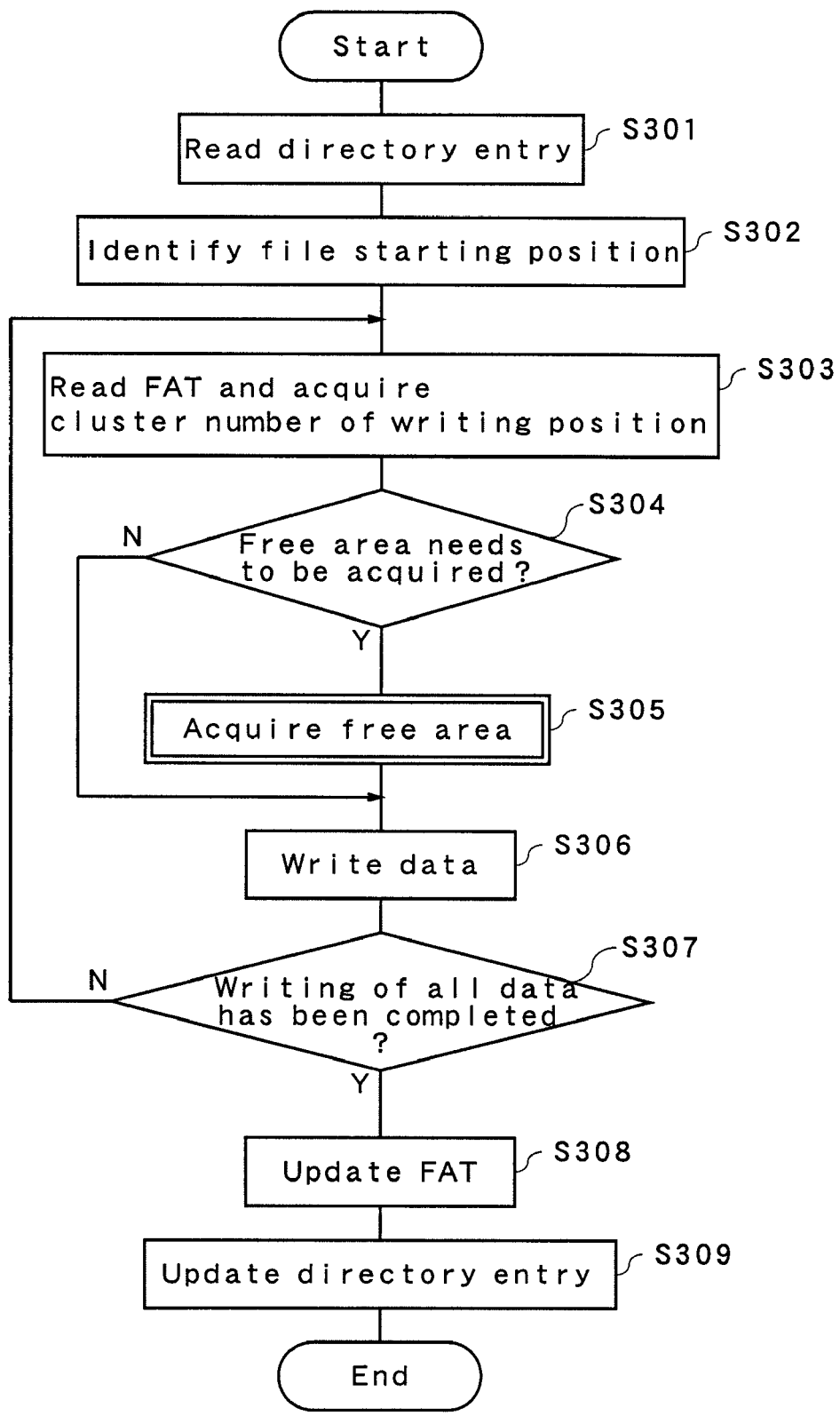
FIG. 15 is a flowchart showing real time data record processing in the access device according to the embodiment of the present invention.

FIG. 15 is a flowchart showing record processing for real time data in the access device. The area management block information created as described above is used for free area acquisition processing during the real time data recording shown in FIG. 15. Next, referring to FIGS. 15, 16A, and 16B, the free area acquisition processing in the present embodiment will be described.

Figure 16A:
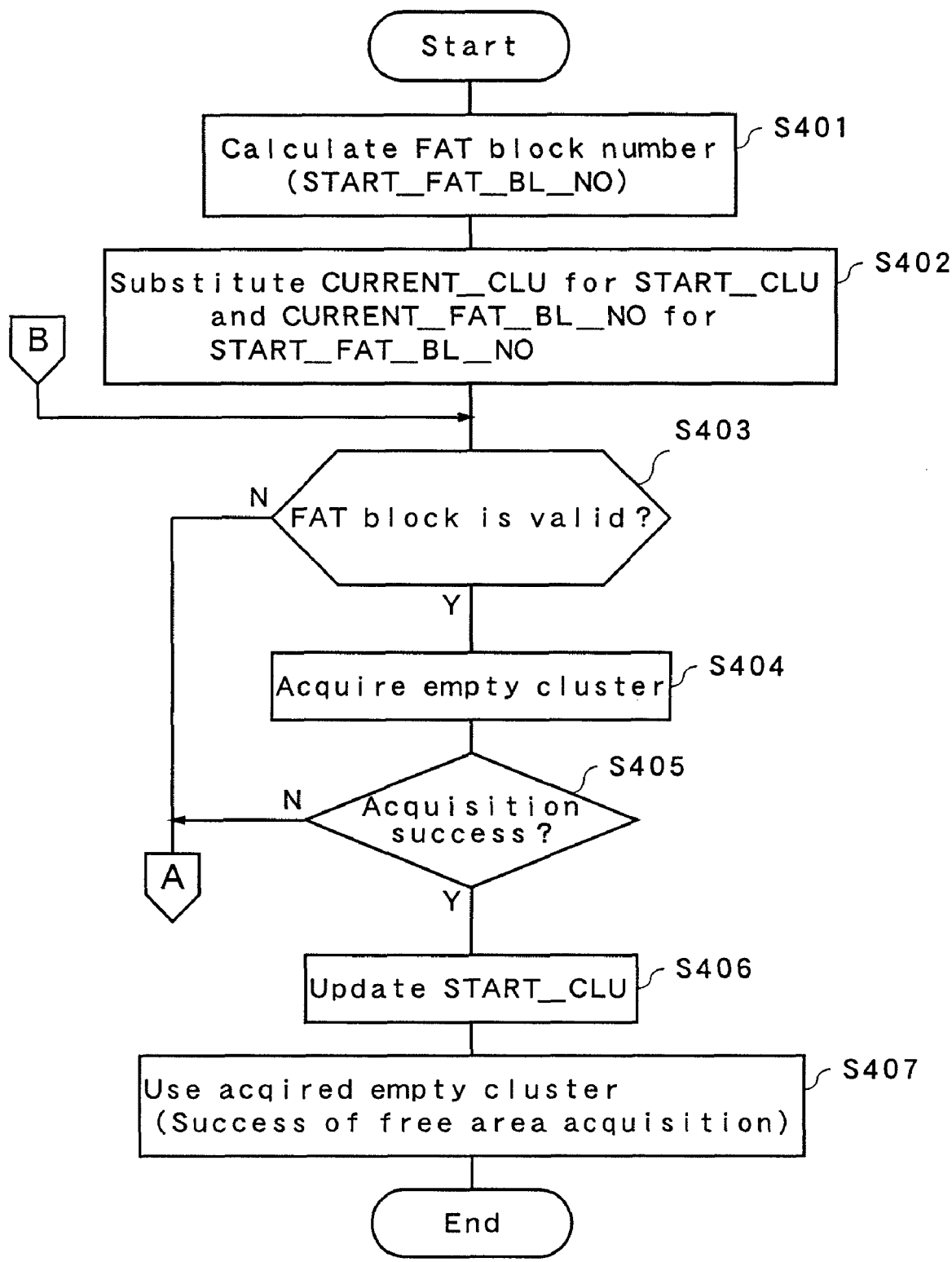
FIG. 16A is a flowchart showing free area acquisition processing in the access device according to the embodiment of the present invention.
Figure 16B:
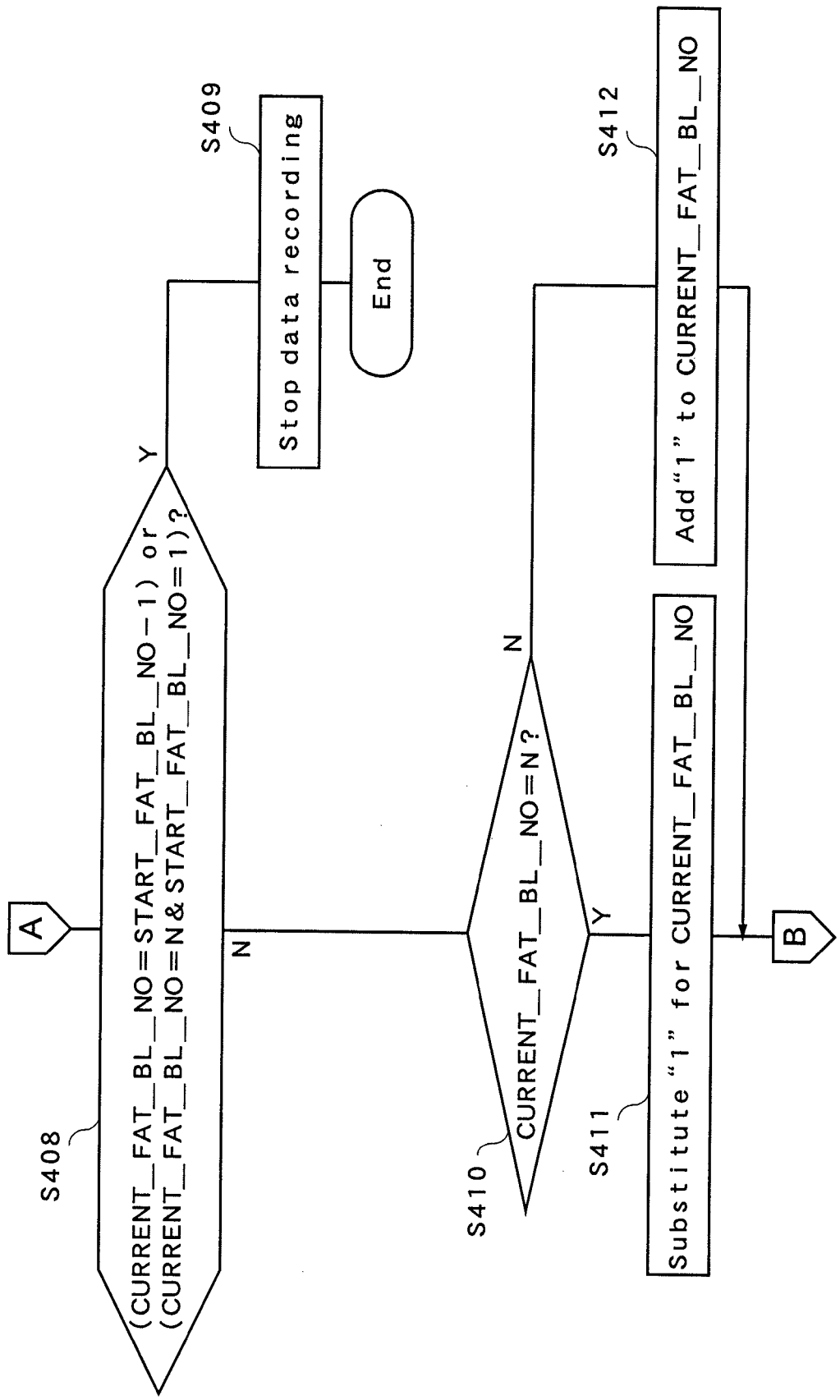
FIG. 16B is a flowchart showing the free area acquisition processing in the access device according to the embodiment of the present invention.

FIGS. 16A and 16B are flowcharts of the free area acquisition processing performed in S305 of FIG. 15. This free area acquisition processing is processing for assigning a free area based on the area management block information. It is assumed that the FAT 1 and FAT 2 are divided into N-number of FAT blocks for management. In the free area acquisition processing of FIGS. 16A and 16B, a search start FAT block number (START_FAT_BL_NO) including a FAT entry corresponding to a search start cluster number on the FAT is first calculated (S401). The search start cluster number in an initial state is 2 indicating the top cluster number.

When the FAT 16 file system is used with a FAT block size of 512B, a formula for calculating the search start FAT block number is as shown below:

Search start FAT block number=$Ip$ (search start cluster number×2/512)+1), where $Ip(X)$ denotes an integer portion of X.

For example, when the search start cluster number is "300", the search start FAT block number is "2".

Next, the search start cluster number is substituted for the value of a reference cluster number currently referenced, and also the search start FAT block number is substituted for a reference FAT block number (CURRENT_FAT_BL_NO) currently referenced (S402).

Next, with reference to the area management block information 19, it is judged whether or not a flag of the FAT block corresponding to the reference FAT block number is "VALID" (S403). If the flag is "VALID", an attempt to acquire empty clusters in the FAT block corresponding to the reference FAT block number is made (S404).

Specifically, in the FAT block currently referenced, values are checked in order starting with the FAT entry corresponding to the reference cluster number in search of the FAT entry with "0x0000". In this case, each time one FAT entry is checked, "1" is added to the value of the reference cluster number to update the cluster number currently referenced.

If the search of the FAT block currently referenced up to its end has been completed, or if the FAT entry with "0x0000" has been found before a value of the reference cluster number exceeds that of the cluster number at the end of the user data area 302, the area acquisition has succeeded (S405). Subsequently, the cluster number of the acquired empty cluster is substituted for the search start cluster number to update START_CLU (S406). The acquired empty cluster is used for the real time data recording (S407), thereby ending the processing. In this processing, the same processing as that of S803 and S804 is carried out.

Moreover, if the FAT entry with "0x0000" has not been found, or if the flag is "INVALID" at the judgment in S403, it is judged if either one of the following conditions is satisfied (S408):

(1) the reference FAT block number is a value smaller than the search start FAT block number by 1; and
(2) the value of the reference FAT block number is "N", and the search start FAT block number is "1".

If either one of the conditions has been satisfied, the area search of all the FAT blocks has been already completed, and thus no free recording area that can be used for the real time data recording is present. That is, the free recording area acquisition has failed; thus, the series of recording area acquisition processing ends, thereby stopping the real time data recording (S409).

If either one of the conditions is not satisfied in the processing of S408, it is checked if the value of the reference FAT block number is "N" (S410). If the value is "N", "1" is substituted for the value of the reference FAT block number, and the processing returns to S403 (S411). If the value is not "N", "1" is added to the value of the reference FAT block number and the processing returns to S403 (S412). As described above, in the area acquisition processing in the access device 1 of the present embodiment, only the FAT blocks whose flag is "VALID" are targeted for the free area search.

Figure 17:
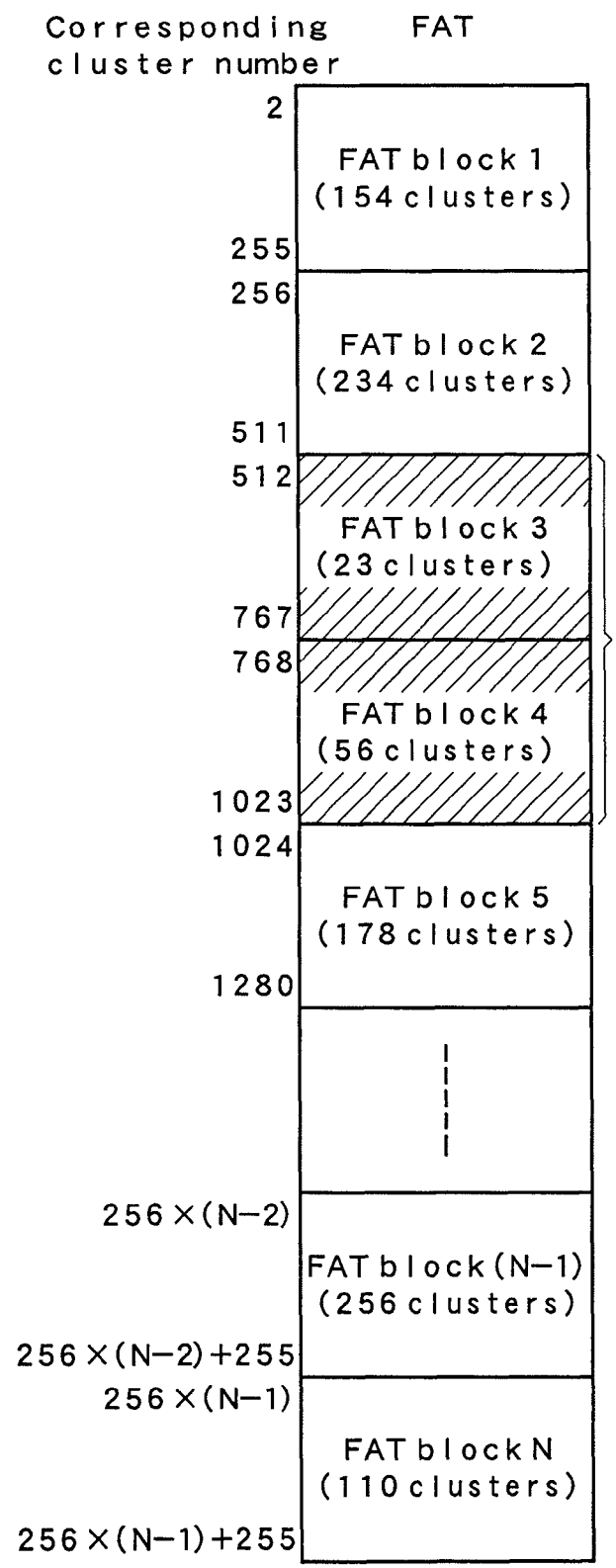
FIG. 17 is an explanatory diagram showing one example of an FAT state in the FAT management by the area management block control part in the embodiment of the present invention.
Figure 18:
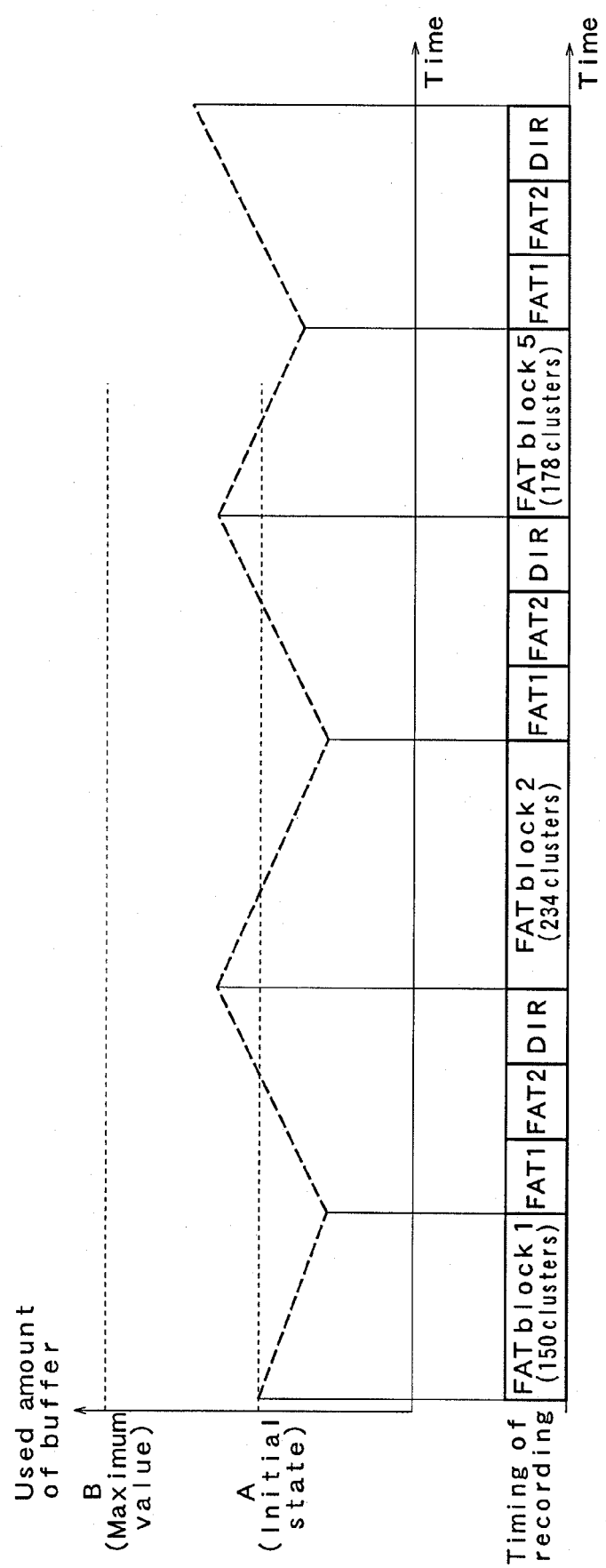
FIG. 18 is an explanatory diagram showing one example of the amount of buffer usage in the access device and timing of recording to an information recording medium in the embodiment of the present invention.

Changes of a FAT update timing and an amount of buffer use in the real time data recording in a case of carrying out the area acquisition processing of FIGS. 16A and 16B will be described with referring to FIGS. 17 and 18. FIG. 17 shows states of the FAT 1 and FAT 2 when the area management block information is in a state shown in FIG. 14. The FAT block 3 and FAT block 4 indicated by diagonal lines have the numbers of empty clusters smaller than the threshold value, i.e., 100, and thus are not used for the real time data recording. When the value of the search start cluster number is "2" in this FAT state, performing the real time data recording changes the amount of buffer use and the timing of recording into the memory card 2 in the access device 1 as shown in FIG. 18.

In a state immediately after the start of the real time data recording, real time data of 154 clusters is first recorded into a free area included in the FAT block 1. Next, the FAT 1 and FAT 2 and the directory entry are recorded. This processing is collectively called FAT update. In this recording of the FAT 1 and FAT 2, an update portion is limited to an inside of the FAT block 1, and thus the update volume is equivalent to only one FAT block.

Next, real time data of 234 clusters is recorded into a free area included in the FAT block 2. Thereafter, FAT update, that is, recording of the FAT 1 and FAT 2 and directory entry, is similarly performed, and also in this case, an update portion corresponds to only one FAT block.

Next, the FAT block 3 and FAT block 4 have a flag with "INVALID" in the area management block information 19 shown in FIG. 14, and thus are not used for the real time data recording. Real time data, therefore, is recorded into a free area of 178 clusters included in the next FAT block 5. Thereafter, FAT update namely recording of the FAT 1 and FAT 2 and directory entry is similarly performed, and also in this case, the update portion corresponds to only one FAT block.

As described above, by recording real time data only into the free recording areas included in the FAT blocks having a flag with "VALID" in the area management block information 19, the FAT update volume is always equivalent to only one FAT block, which ensures that the volume of real time data recorded between the two consecutive FAT updates becomes equivalent to the number of clusters larger than or equal to the threshold value. Thus, it is possible to prevent buffer overflow due to high frequency of FAT updates, thereby being able to ensure the real time performance during the real time data recording.

As described above, by setting the threshold value, the data recording speed can be reliably kept at a constant level or higher. A method for determining this threshold value will be described below. The threshold value described here is called a first threshold value (BORDER), and indicates the minimum volume of real time data required to be recorded during (t−1)-number of data recordings between consecutive t-number of FAT updates. This is used for determining whether or not to use a free area included in each FAT block for the real time data recording. First, a description will be given, concerning a case where the BORDER is determined based on the minimum volume of real time data required to be recorded during a period of data recording sandwiched between two consecutive FAT updates. The BORDER where t=2 is particularly defined as BORDER-1.

For the description of the method for determining the BORDER-1, a total of three writings of the FAT 1, FAT 2, and directory entry are defined as one set of FAT updates, and the processing time for one set of FAT updates (T_FAT, hereinafter referred to as Tf) is assumed to be 100 msec. Moreover, it is assumed that, a bit rate (TARGET_RATE, hereinafter referred to as Tr) of real time data recorded by the access device 1 is 3 MB/s, and a rate (REC_RATE, hereinafter referred to as Rr) at which the real time data is recorded into the memory card 2 is 4 MB/s.

In this case, the time (T_DATA, hereinafter referred to as Td) required for recording 1-second real time data is calculated by the following formula:

$$Td=(Tr/Rr) \times 1000.$$

That is, the calculation provides Td=750 msec. Moreover, the number of FAT updates (Fc) that can be carried out in every second is calculated by the following formula:

$$Fc=(1000-Td)/Tf.$$

That is, the calculation provides Fc=2.5 times. Thus, the minimum number of clusters required for recording during data recording sandwiched between two consecutive sets of FAT updates is calculated by the following formula:

$$BORDER\text{-}1 = Rr \times Td/1000/Fc/Cs,$$

where Cs denotes a cluster size; thus, when the cluster size is 16 kB, the calculation provides BORDER-1=76.8. That is, setting "77" was the BORDER-1 and using the number of clusters larger than or equal to the BORDER-1 can ensure the real time performance during the real time data recording in this example.

Next, a modified example of the present embodiment will be described below. In the method described above, a FAT block smaller than the BORDER-1 is treated as "INVALID", and a recording area managed by this FAT block is never used for the real time data recording. However, if a FAT block managing a large free area can be combined right before or after the invalid FAT block, even the FAT block of "INVALID" state in the above example may be used. Determination of a threshold value in this case will be described as follows.

Here, the description is given, concerning a case where the BORDER is determined based on the minimum volume of real time data required to be recorded during two periods of data recordings sandwiched between three consecutive FAT updates. This BORDER corresponds to a case where t=3 in the definition of BORDER described above. The BORDER this time is specifically defined as BORDER-2. A definition of FAT updates, definitions of Tf, Tr, Rr, Td, FAT_COUNT (Fc) as the number of FAT updates, and a definition of CLU_SIZE (Cs) as the cluster size, which are all used in the description, are as shown above.

The BORDER-2 in this case is determined based on the minimum volume of real time data required to be recorded during two periods of data recordings, and thus is obtained by a formula below:

$$BORDER\text{-}2 = Rr \times Td/1000/Fc/Cs \times 2.$$

When Cs is 16 kB, the calculation provides BORDER-2=153.6. That is, setting "154" as BORDER-2 and using the number of clusters larger than or equal to the BORDER-2 can ensure the real time performance during the real time data recording.

Since generation processing for area management block information is different from that in FIG. 13 in a case of considering a period of two data recordings sandwiched between three consecutive FAT updates as described above, the processing will be described below referring to FIGS. 19A, 19B, and 20.

Figure 19B:
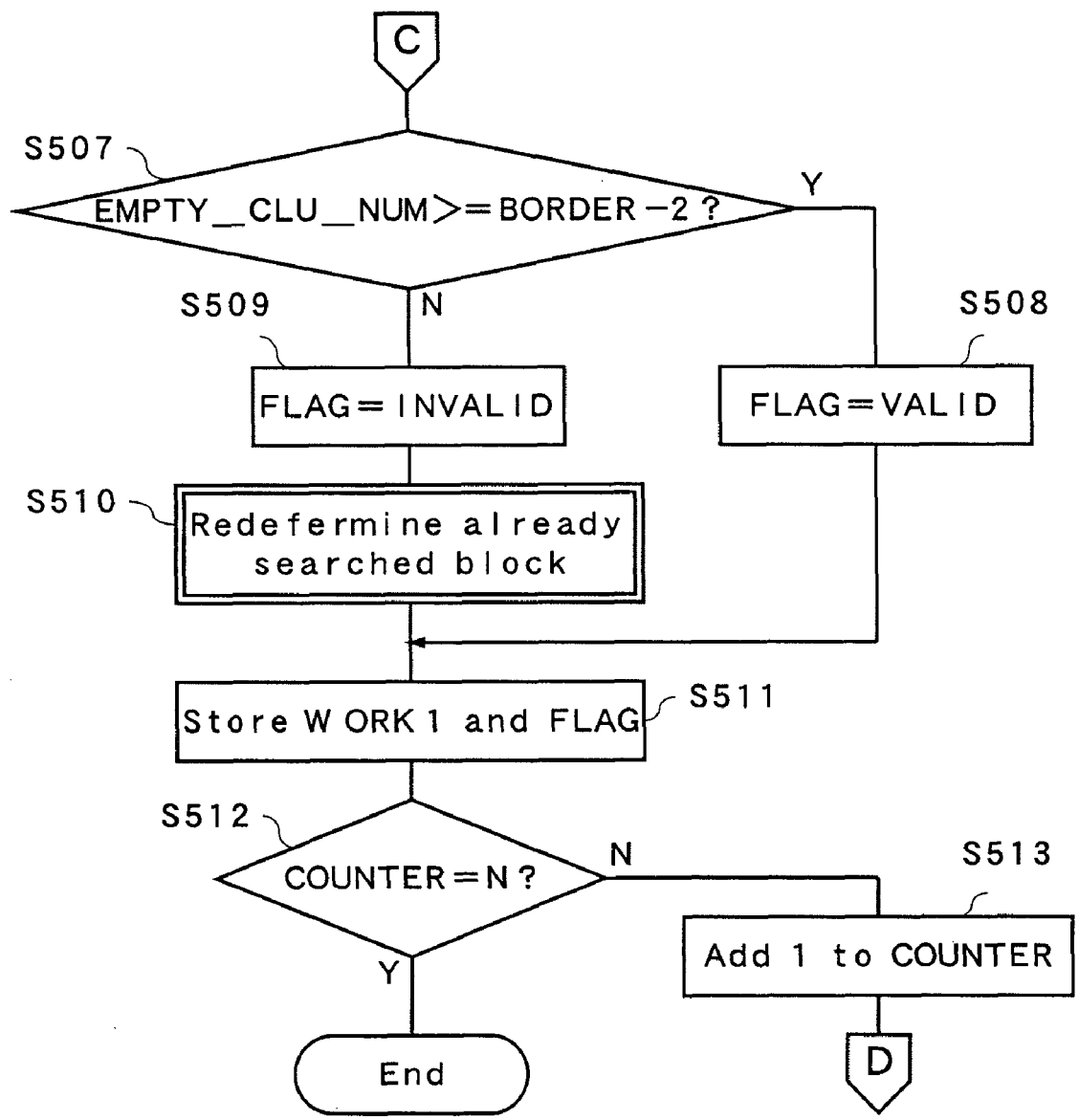
FIG. 19B is a flowchart showing the generation processing of the area management block information in the embodiment of the present invention.

In FIGS. 19A and 19B, a value of COUNTER indicating the number of a FAT block currently referenced is first set at "1" (S501). The number of empty clusters in the FAT block indicated by the value of COUNTER is calculated and provided as WORK 1 (S502). Next, it is checked if the value of COUNTER is "N" (S503). Although the value of COUNTER starts with "1", the value of COUNTER returned by a loop from the subsequent processing of S513 is larger than "1"; thus, it is judged in S503 whether or not the value is "N".

If the value of COUNTER is not "N", the number of empty clusters in the FAT block with a number obtained by adding 1 to the value of COUNTER is calculated and provided as WORK 2 (S505). Since the current value of COUNTER is "1", the number of empty clusters in the FAT block 2 as a second FAT block is provided as WORK 2. However, when the value of COUNTER is "N", it indicates that the FAT block N as the last FAT block is being referenced and no subsequent FAT block is present, thus "0" is provided as WORK 2 (S504).

Subsequently, WORK 1 and WORK 2 previously obtained are added together to obtain the number of empty clusters (S506). The value of the number of empty clusters is compared with the predetermined the BORDER-2 (S507). If the number of empty clusters is larger than or equal to the BORDER-2, the FAT block indicated by the value of COUNTER can be used for the real time data recording, and thus the flag is set as "VALID" to indicate that this FAT block is valid for the real time data recording (S508). This "VALID" flag and WORK 1 are stored into the area management block information as information on the FAT block indicated by the value of COUNTER (S511).

On the other hand, when the number of empty clusters is smaller than the BORDER-2, the FAT block indicated by the value of COUNTER cannot be used for the real time data recording. In this case, the flag is set as "INVALID" to indicate that the FAT block is not valid for the real time data recording (S509).

Processing, following S509, of redetermining already searched block (S510) will be described, referring to FIG. 20. First, it is judged whether or not the value of COUNTER is "1" (S601), and if it is "1", the processing proceeds to S511, and an "INVALID" flag and WORK 1 are stored into the area management block information as information on the FAT block indicated by the value of COUNTER. If the value of COUNTER is not "1", 1 is subtracted from the value of COUNTER to provide L_COUNTER (S602).

The number of empty clusters in the FAT block indicated by the value of L_COUNTER is obtained and provided as L_WORK (S603). This L_WORK is compared with the BORDER-2 used in S507 (S604). If L_WORK is larger than or equal to the BORDER-2, the processing shown in a flow of FIG. 20 ends and the processing proceeds to S511, and an "INVALID" flag and WORK 1 are stored into the area management block information, as information on the FAT block indicated by the value of COUNTER.

If L_WORK is smaller than the BORDER-2, an "INVALID" flag is stored as information on the FAT block indicated by the value of L_COUNTER in the area management block information (S605).

Next, it is determined whether or not the value of L_COUNTER is "1" (S606). If the value of L_COUNTER is not "1", 1 is subtracted from the value of L_COUNTER (S607), and the same processing is repeated through looping to S603. However, the value of L_COUNTER being "1" indicates that the FAT block 1 at the top of the FAT blocks is being referenced, and since no FAT block to be referenced is present further ahead thereof, the processing of the already searched block redetermination (S510) ends, and the processing proceeds to S511, where the "INVALID" flag and WORK 1 are stored into the area management block information as information on the FAT block indicated by the value of COUNTER.

Back to FIGS. 19A and 19B, following the processing of S511, it is judged whether or not the current value of COUNTER is "N" (S512). If it is not "N", 1 is added to the value of COUNTER (S513), and the same processing is performed through looping to S502, and the same processing is repeated until the COUNTER reaches "N". The state of being "N" indicates that the FAT block N is currently being referenced, and since no FAT block to be referenced is present further behind thereof, the generation processing of area management block information ends.

Referring to FIGS. 14, 19A, 19B, 20, and 21, the generation processing of the aforementioned area management block information will be described with actual numerical values applied to COUNTER, WORK 1, and WORK 2. WORK 1 and WORK 2 of FIG. 21 use the number of empty clusters in FIG. 14, thus using the same number of empty clusters in each FAT block. Here, BORDER-2 is set at 154.

If the value of COUNTER is 1 in S501, WORK 1 in S502 is 154 indicated by the FAT block 1. Since the value of COUNTER is not "N" in S503, WORK 2 is 234 indicated by the FAT block 2, and a total number of empty clusters in the two FAT blocks is 388 in S506. According to a comparison in S507, the number of empty clusters is larger than or equal to 154, i.e., the value of BORDER-2, and thus the flag of the FAT block 1 is set as "VALID" in S508. Turning to S511, as the value of COUNTER indicates, as information on the FAT block 1, WORK 1 is set at 154 and the flag is set as "VALID", and they are stored into the area management block information. In S512, the value of COUNTER is not "N" but "1", and thus the processing turns to S513, where 1 is added to the value of COUNTER to set the value of COUNTER at 2, and the processing proceeds to S502.

If the value of COUNTER is 2, WORK 1 is 234 and WORK 2 is 23 in S505, and a total number of empty clusters in S506 is 257. It is judged in S507 that this is also larger than or equal to BORDER-2, and thus as information on the FAT block 2, WORK 1 is set at 234 and the flag is set as "VALID", and they are stored into the area management block information in S511. In S513, 1 is added to the value of COUNTER to set the value of COUNTER at "3", and looping to S502 occurs.

When the value of COUNTER is 3, WORK 1 is 23 and WORK 2 is 56 in S505, and a total number of empty clusters in S506 is 79. This value is not larger than or equal to BORDER-2 in S507, and thus the flag of the FAT block 3 is set as "INVALID" in S509.

Figure 20:
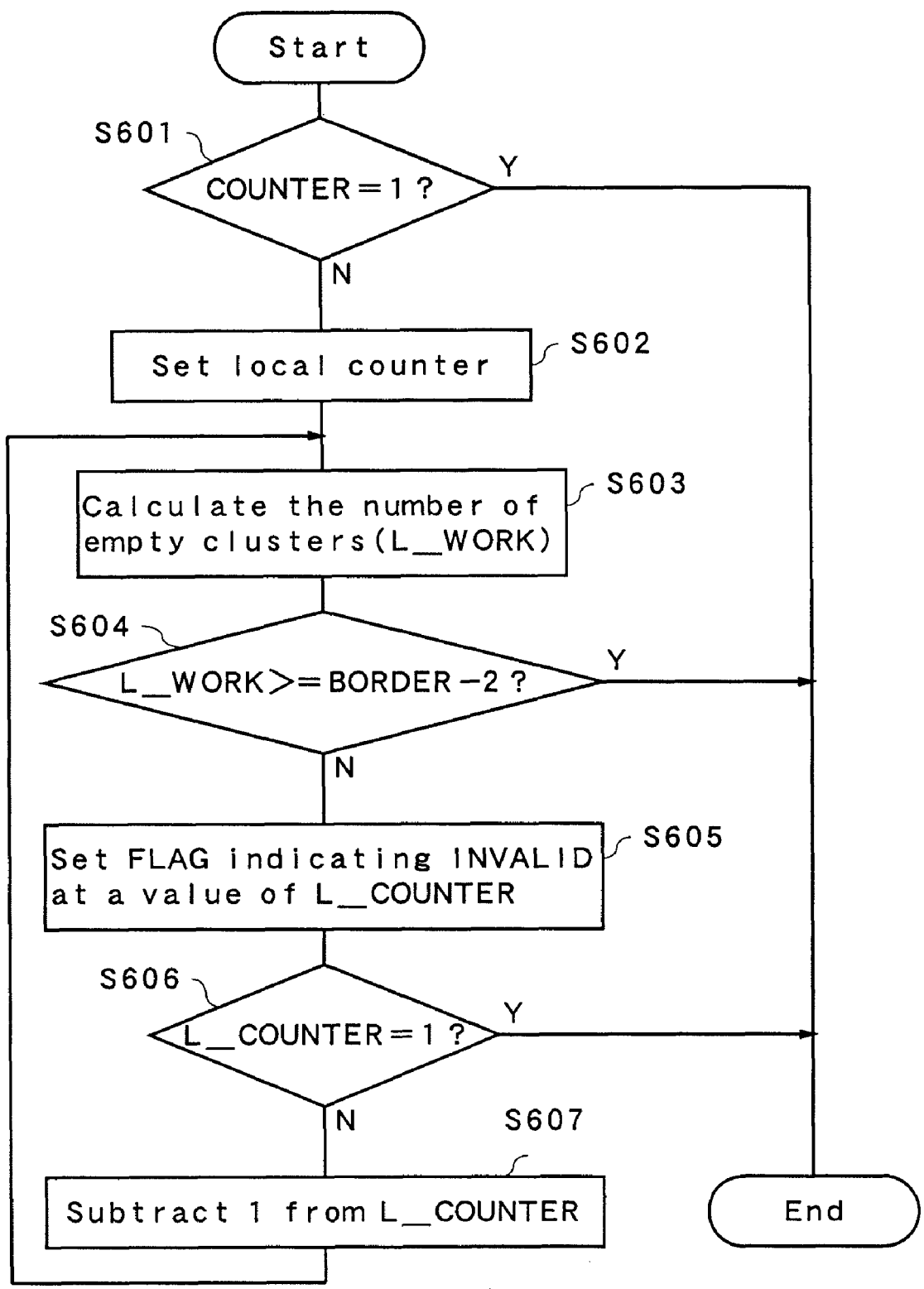
FIG. 20 is a flowchart showing already searched block redetermination processing in the embodiment of the present invention.

Next, turning to the processing of S510, it is judged in S601 of FIG. 20 whether or not the value of COUNTER is 1. Since the current value of COUNTER is "3", the value of L_COUNTER (=COUNTER-1) is "2" in S602. Since the value of L_COUNTER is "2", the number of empty clusters in the FAT block 2, i.e., L_WORK is calculated to obtain 234 as the value of L_WORK in S603. This L_WORK denotes not a total of free areas in the two FAT blocks but a free area in only the FAT block 2, but is still larger than or equal to BORDER-2; therefore, since its usage for the real time data recording is possible even in combination with the FAT block 3, the "VALID" flag of the FAT block 2 is maintained.

If L_WORK here is 131, the flag of the FAT block 2 is already "VALID" but is smaller than BORDER-2, and thus the flag of the FAT block 2 is set as "INVALID" again in processing of S605. The grounds for this processing can be described as follows. That is, since the flag of the FAT block 3 is "INVALID" and the number of empty clusters is treated as 0, L_WORK does not become larger than or equal to BORDER-2 in combination with the FAT block 3, which also disables the use of the FAT block 2. Such processing is repeated until the value of COUNTER reaches "N" to generate area management block information provided with WORK 1 and a flag with respect to each FAT block number.

Through the generation and use of such area management block information, the number of FAT updates is not influenced by an arrangement condition of the free recording areas in the user data area 302, which can prevent buffer overflow, thereby ensuring the real time performance during the real time data recording. Further, in the access device of the present invention, the free recording areas included in the FAT blocks do not necessarily need to be consecutive; thus, even when small free recording areas are present in the FAT block in a distributed manner, the number of FAT updates is reduced, which permits the real time data recording and an efficient use of the free recording areas in the user data area 302.

Hereinbefore, the embodiment of the preset invention has been described, but the present invention is not limited to the embodiment described above, and thus can be modified within the scope of the present invention. The various numerical values described in the present embodiment are each just one example, and the present invention can be realized with other values.

For example, a case where the FAT block size is 512B has been described, but it may be changed to, for example, 16 kB. Moreover, a case where the area management block information 19 is generated upon memory card insertion has been described, but it may be generated at arbitrary timing after the insertion, such as timing of switching from a mode for taking still image data to a mode for taking moving image data, or timing of power activation of the access device. Further, upon the update of the FAT1 and the FAT 2, the contents of area management block information 19 may be updated sequentially.

Moreover, a memory card has been described as an example of an information recording medium, but any other type of information recording medium, such as a hard disk or optical disk, may be used as long as it is featured by that recording in small units is performed at relatively low-speed and relatively high-speed in large units.

For an information recording medium always connected to the access device 1 such as a hard disk or the like, the same processing as that of FIG. 11 may be performed simultaneously with power activation of the access device 1 or immediately before use of the information recording medium. In this case, the processing of S101 and S102 is not required, and initialization processing specific to the information recording medium may be inserted if necessary.

Moreover, the present embodiment has been described referring to the FAT file system as an example of a file system, but other file systems may be used. For example, in a UDF file system, management of free recording areas is managed by a bit map called SpaceBitMap. In the application of the present invention to the UDF file system, SpaceBitMap blocks made by dividing SpaceBitMap into blocks of a fixed length for management may be used for control instead of FAT blocks.

Hereinbefore, it has been described that real time data is not recorded into a FAT block in which only a free recording area smaller than BORDER-1 or smaller than BORDER-2 is present. The recording area, however, can be used even more efficiently by recording into such a FAT block data of a still image or the like that does not require the real time performance.

The present embodiment has been described, referring to cases where t=2 and t=3 in the aforementioned definition of BORDER. However, regardless of these t values, a value of 4 or larger may be set for t. This permits real time data recording even in a FAT block with a small capacity of free recording area under the presence of a FAT block with a large capacity of free recording area located ahead or behind thereof, which permits even more efficient use of the free recording areas.

Further, in the present embodiment, the method for calculating "the number of all empty clusters included in a corresponding FAT block" and comparing it with BORDER-1 or BORDER-2 to determine a flag has been described, but it may be changed as follows.

Figures 22A, 22B:
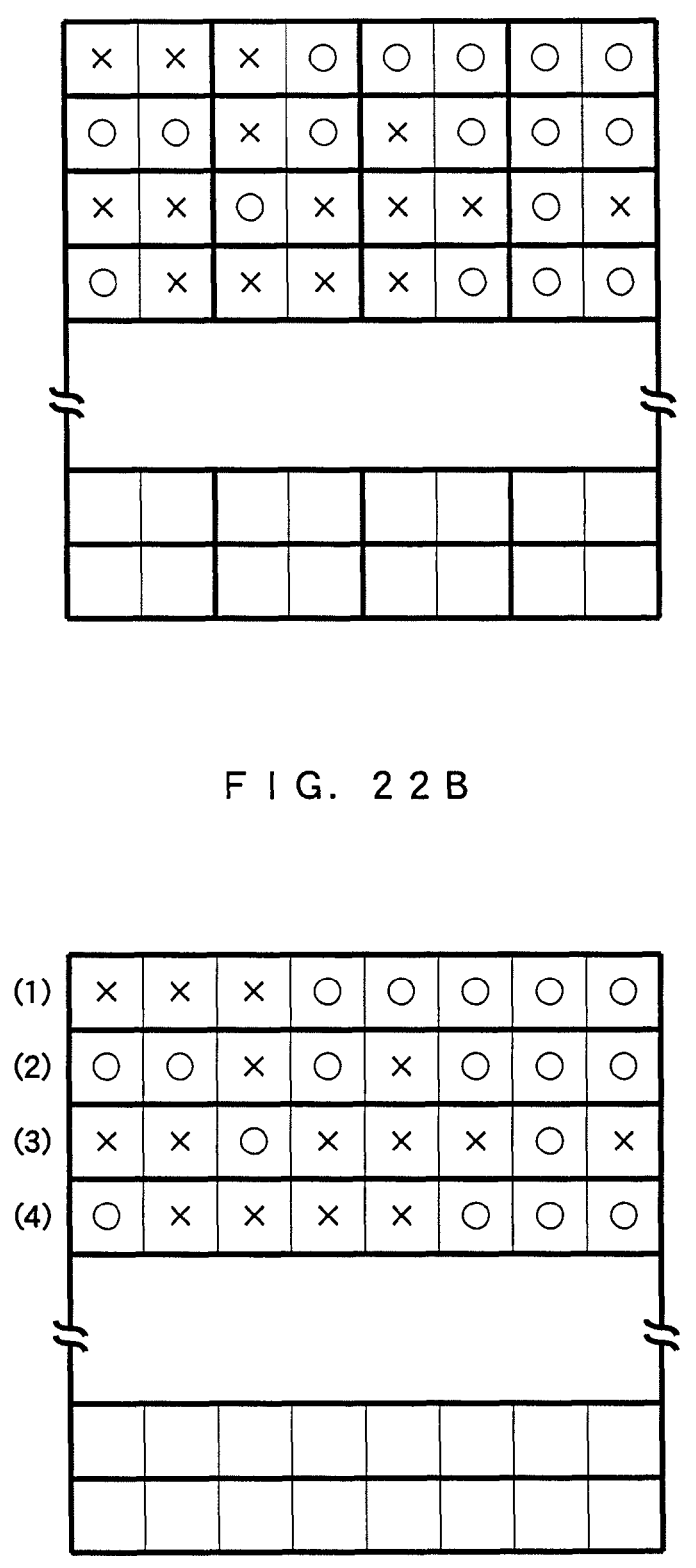

(1) There is a method for defining a plurality of consecutive FAT entries as one data recording unit. For example, FIG. 22A shows one FAT block where each of squares is a FAT entry. Marks "O" and "X" represent statuses of clusters managed by the corresponding FAT entries; the marks "O" denote that a cluster is free and the marks "X" denote that valid data has been already recorded into a cluster. As shown in the figure, where sequences of two FAT entries from the top are each provided in a set as a data recording unit, this data recording unit is provided as "free data recording unit" when the two FAT entries included in this data recording unit have a mark "O". Next, the number of empty clusters managed by the "free data recording unit" included in the FAT blocks is compared with the BORDER-1 or BORDER-2 to determine a flag indicating whether or not the FAT blocks can be used. This permits use of at least two consecutive empty clusters for the real time data recording.

(2) As another method, it is possible to compose one slot with a plurality of consecutive clusters. For example, FIG. 22B shows a state in which each of sequences of eight FAT entries from the top, in one set, composes a slot. FIG. 22B also shows one FAT block, and the square, mark "O", and mark "X" denote the same meanings as in (A). Now, the number of marks "O" in a slot is 5 for slot (1), 6 for slot (2), 2 for slot (3), and 4 for slot (4). Since the mark "O" denotes that the cluster managed by the corresponding FAT cluster is empty, slot (1) manages five empty clusters and slots (2), (3), and (4) manage the same number of clusters as those of their marks "O". Here, to select a slot managing a certain number of empty clusters or more, a second threshold value is introduced. The second threshold value is a minimum number of empty clusters to be ensured in one slot, and is used for comparison with the number of marks "O" in one slot. Here, assuming that the second threshold value is 5, slots (1) and (2) have five or more marks "O" and thus are slots larger than or equal to the second threshold value, while slots (3) and (4) are slots smaller than or equal to the second threshold value. These slots (1) and (2) larger than or equal to the second threshold value are treated as "empty slots", the marks "O" included in all the empty slots in one FAT block, that is, the number of empty clusters are summed up and this sum total is compared with BORDER-1 or BORDER-2. Through this comparison, it is determined whether or not the FAT block can be used.

The slot described in (2) is different from the recording unit described in prior (1). The slot and recording unit are both composed of a plurality of consecutive clusters and intended to perform real time data recording at higher speed, but have a difference in the number of clusters used for their composition and the slot is composed of more clusters.

For example, for a memory card using a flash memory, a relationship between the volume of data recorded into an erase block size and the recording speed is nearly proportional relationship; therefore, an increase in the volume of data recorded into the erase block size results in a higher recording speed. Thus, all FAT entries managing clusters (here, 32 clusters) composing one erase block is set as one slot, and a FAT block is composed of one or more slots (here, eight slots). Furthermore, selecting only the slots in which at least a certain number of free recording areas or more are present assures a certain volume of new data or more that can be recorded in one erasing, which permits ensuring high recording speed.

Moreover, an example where a flag is stored into the area management block information 19 has been described, but through a comparison between the first threshold value and the number of clusters at each determination processing of S403, no flag is required, and there is no need to store a flag into the area management block information 19.

INDUSTRIAL APPLICABILITY

The access device according to the present invention, for the information recording medium managed by the file system, manages area management information such as FAT in units of blocks of a fixed length, and uses for real time data recording only free recording areas included in area management information blocks including free recording areas larger than or equal to a threshold value. Accordingly, without relying on an arrangement state of free recording area in a user data area, buffer overflow due to high frequency of FAT updates can be prevented, thereby ensuring the real time performance during real time data recording. Such an access device can be used as a portable movie player, DVD recorder, HDD recorder, digital television equipped with recorder function, digital still camera, IC recorder, or the like, that record moving image data, audio data, etc. in real time.

The invention claimed is:

1. An information recording medium access device configured for accessing an information recording medium, including a nonvolatile memory,
   wherein said nonvolatile memory includes:
   a data recording area composed of a collection of a plurality of clusters, each cluster of said plurality of clusters having a unique cluster number; and area management information holding a plurality of pieces of entry information, each piece of said plurality of pieces of entry information corresponding to a cluster, wherein said area management information has a plurality of area management blocks, each of said area management blocks is composed of a first constant number of pieces of said entry information having a first consecutive number of clusters, wherein said area management information has a plurality of slots, each of said slots is composed of a second constant number of pieces of said entry information having a second consecutive number of clusters, and wherein said information recording medium access device comprises:

an area management block controller configured for determining a slot as an empty slot when the slot has empty clusters of a number equal to or greater than a second threshold value in clusters included in the slot, and configured for determining the area management block as an area into which data can be written when a number of empty clusters included in all empty slots in said area management block is equal to or greater than a first threshold value; and a recording controller configured for writing file data to areas of said nonvolatile memory corresponding to said area management blocks which have been determined as areas into which data can be written.

2. The information recording medium access device according to claim 1, wherein said first threshold value is a number of clusters that permits recording of file data required to be necessarily recorded during (t−1)-number of data recordings sandwiched between consecutive t-number of updates of file system management information, and wherein t is a positive integer equal to or greater than two.

3. The information recording medium access device according to claim 1, wherein said recording controller writes said file data to said nonvolatile memory only when said file data is real time data for recording.

4. The information recording medium access device according to claim 1, wherein said second constant number is smaller than said first constant number.

5. An information recording method for accessing an information recording medium, including a nonvolatile memory, comprising:

configuring said nonvolatile memory to include:
a data recording area composed of a collection of a plurality of clusters, each cluster of said plurality of clusters having a unique cluster number; and
area management information holding a plurality of pieces of entry information, each piece of said plurality of pieces of entry information corresponding to a cluster, wherein said area management information has a plurality of area management blocks, each of said area management blocks is composed of a first constant number of pieces of said entry information having a first consecutive number of clusters, wherein said area management information has a plurality of slots, each of said slots is composed of a second constant number of pieces of said entry information having a second consecutive number of clusters;

determining, by an area management block controller, that a slot as an empty slot when the slot has empty clusters of a number equal to or greater than a second threshold value in clusters included in the slot, and for determining the area management block as an area into which data can be written when a number of empty clusters included in all empty slots in said area management block is equal to or greater than a first threshold value; and writing, by a recording controller, file data to areas of said nonvolatile memory corresponding to said area management blocks which have been determined as areas into which data can be written.

6. The information recording method according to claim 5, wherein said first threshold value is a number of clusters that permits recording of file data required to be necessarily recorded during (t−1)-number of data recordings sandwiched between consecutive t-number of updates of file system management information, and wherein t is a positive integer equal to or greater than two.

7. The information recording method according to claim 5, wherein said recording controller writes said file data to said nonvolatile memory only when said file data is real time data for recording.

8. The information recording method according to claim 5, wherein said second constant number is smaller than said first constant number.

* * * * *